(12) United States Patent
Liao

(10) Patent No.: US 11,831,458 B2
(45) Date of Patent: Nov. 28, 2023

(54) PROVISIONING OF MULTICAST AND BROADCAST SERVICES WITH DIFFERENT QUALITY OF SERVICE LEVELS

(71) Applicant: Intel Corporation, Santa Clara, CA (US)

(72) Inventor: Ching-Yu Liao, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 16/951,976

(22) Filed: Nov. 18, 2020

(65) Prior Publication Data

US 2021/0075631 A1 Mar. 11, 2021

Related U.S. Application Data

(60) Provisional application No. 62/937,407, filed on Nov. 19, 2019.

(51) Int. Cl.
*H04L 12/18* (2006.01)
*H04W 12/06* (2021.01)
*H04L 12/14* (2006.01)

(52) U.S. Cl.
CPC ........ *H04L 12/189* (2013.01); *H04L 12/1403* (2013.01); *H04W 12/06* (2013.01)

(58) Field of Classification Search
CPC ............... H04L 12/189; H04L 12/1403; H04L 12/1407; H04L 12/1877; H04W 12/06; H04W 4/24; H04M 15/66; H04M 15/8016; H04M 15/8033; H04M 15/8038
See application file for complete search history.

(56) References Cited

U.S. PATENT DOCUMENTS

| | | | |
|---|---|---|---|
| 2019/0158985 A1* | 5/2019 | Dao | H04L 63/0428 |
| 2021/0105196 A1* | 4/2021 | Dao | H04L 43/026 |
| 2021/0258918 A1* | 8/2021 | Hong | H04W 72/30 |
| 2022/0217508 A1* | 7/2022 | Xiong | H04W 4/06 |
| 2022/0408162 A1* | 12/2022 | Jia | H04W 4/06 |
| 2023/0025675 A1* | 1/2023 | Jia | H04N 21/6405 |
| 2023/0068311 A1* | 3/2023 | Kim | H04W 76/27 |

* cited by examiner

*Primary Examiner* — Abdullahi Ahmed
(74) *Attorney, Agent, or Firm* — Schwabe, Williamson & Wyatt, P.C.

(57) ABSTRACT

Disclosed embodiments are related to configuring and/or provisioning user equipment (UE) for Multicast-Broadcast Service (MBS). The present disclosure provides embodiments to allow a Fifth Generation System (5GS) to configure the MBS sessions based on Quality of Service (QoS) conditions of the receptions of MBS session of the UEs (subscribers). As such, the 5GS is able to provide differentiated QoS flows in the MBS session to UEs, which may have different service subscription in the 5GS and user subscriptions for MBS applications. Other embodiments may be described and/or claimed.

20 Claims, 13 Drawing Sheets

PROVISIONING OF MULTICAST AND BROADCAST SERVICES WITH DIFFERENT QUALITY OF SERVICE LEVELS

CROSS REFERENCE TO RELATED APPLICATION

The present application claims priority to U.S. Provisional App. No. 62/937,407, which was filed Nov. 19, 2019, the contents of which are hereby incorporated by reference in their entireties.

FIELD

Embodiments relate generally to the technical field of wireless communications and communication networks, and in particular to service and feature requirements applicable to mobile and fixed communications technology requirements for non-public networks.

BACKGROUND

The proliferation of video services, ad-hoc multicast/broadcast streams, software delivery over wireless, group communications and broadcast/multicast Internet of Things (IoT) applications have created a need for a flexible and dynamic allocation of radio resources between unicast and multicast services within networks as well as support for stand-alone deployment of multicast/broadcast networks.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1A:
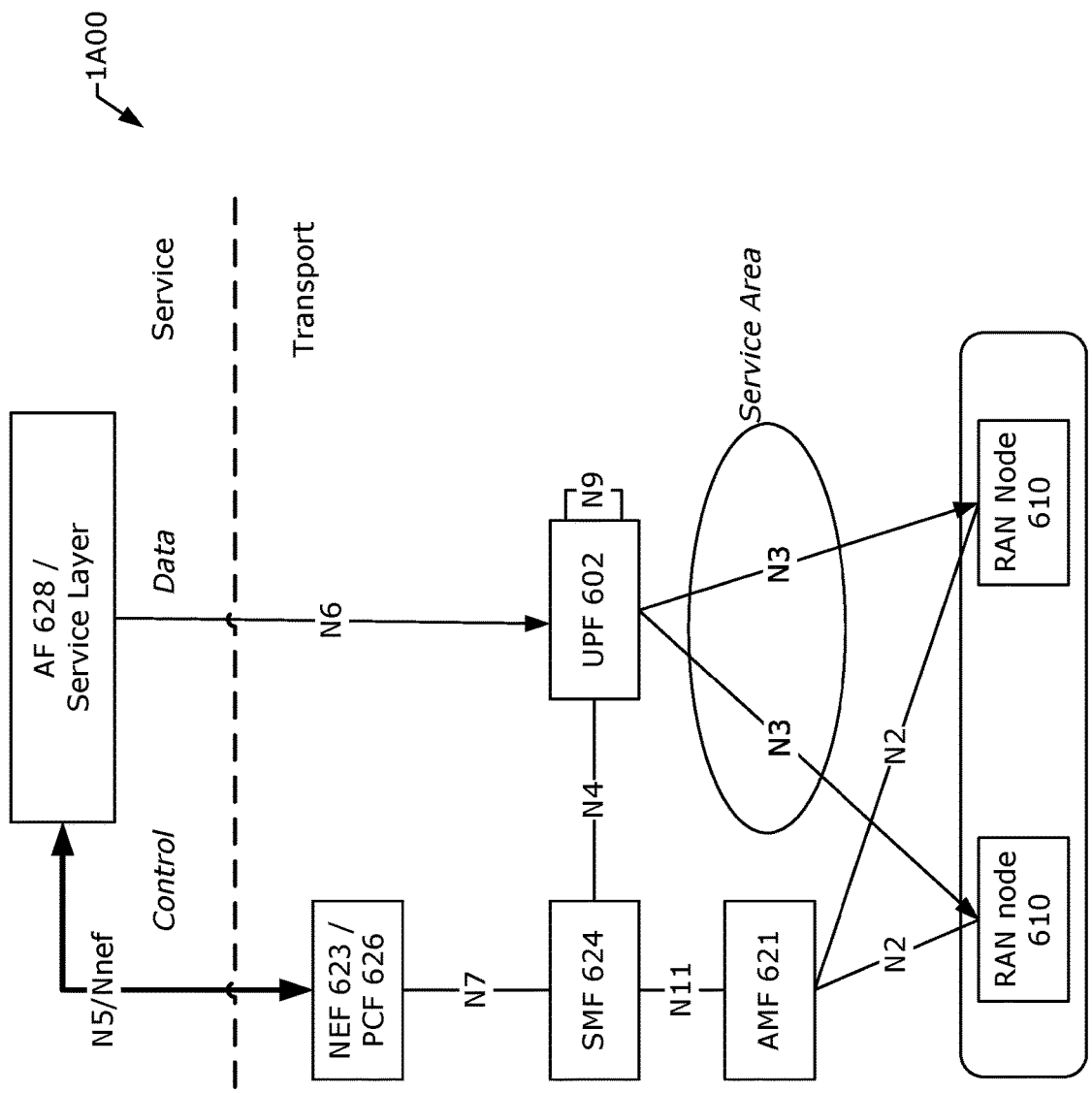
FIG. 1A shows the 5G system (5GS) architecture for integrated Multicast transport with unicast according to various embodiments.

Unlike previous 3GPP systems that attempted to provide a "one size fits all" system, the 3GPP Fifth Generation (5G) system is expected to be able to provide optimized support for a variety of different services, different traffic loads, and different end user communities. Various industry white papers, such as Hattachi et al., "5G White Paper", NGMN Alliance, version 1.0 (17 Feb. 2015), describe a multi-faceted 5G system (5GS) capable of simultaneously supporting multiple combinations of reliability, latency, throughput, positioning, and availability. This technology revolution is achievable with the introduction of new technologies, both in access and the core, such as flexible, scalable assignment of network resources. In addition to increased flexibility and optimization, a 5GS needs to support stringent Key Performance Indicators (KPIs) for latency, reliability, throughput, etc. Enhancements in the air interface contribute to meeting these KPIs as do enhancements in the core network, such as network slicing, in-network caching and hosting services closer to the end points.

A 5GS also supports new business models such as those for Internet of Things (IoT) and enterprise managed networks. Drivers for the 5G KPIs include services such as Unmanned Aerial Vehicle (UAV) control, Augmented Reality (AR), and factory automation. Network flexibility enhancements support self-contained enterprise networks, installed and maintained by network operators while being managed by the enterprise. Enhanced connection modes and evolved security facilitate support of massive IoT, expected to include tens of millions of UEs sending and receiving data over the 5G network.

Flexible network operations are the mainstay of the 5GS. The capabilities to provide this flexibility include network slicing, network capability exposure, scalability, and diverse mobility. Other network operations requirements address the necessary control and data plane resource efficiencies, as well as network configurations that optimize service delivery by minimizing routing between end users and app servers 640. Enhanced charging and security mechanisms handle new types of UEs connecting to the network in different ways.

Mobile Broadband (MBB) enhancements aim to meet a number of new KPIs. These pertain to high data rates, high user density, high user mobility, highly variable data rates, deployment, and coverage. High data rates are driven by the increasing use of data for services such as streaming (e.g., video, music, and user generated content), interactive services (e.g., AR), and IoT. These services come with stringent requirements for user experienced data rates as well as associated requirements for latency to meet service requirements. Additionally, increased coverage in densely populated areas such as sports arenas, urban areas, and transportation hubs has become essential for pedestrians and users in urban vehicles. New KPIs on traffic and connection density enable both the transport of high volumes of data traffic per area (traffic density) and transport of data for a high number of connections (e.g., UE density or connection density). Many UEs are expected to support a variety of services which exchange either a very large (e.g., streaming video) or very small (e.g., data burst) amount of data. The 5GS will handle this variability in a resource efficient manner. All of these cases introduce new deployment requirements for indoor and outdoor, local area connectivity, high user density, wide area connectivity, and UEs travelling at high speeds.

Another aspect of 5G KPIs includes requirements for various combinations of latency and reliability, as well as higher accuracy for positioning. These KPIs are driven by support for both commercial and public safety services. On the commercial side, industrial control, industrial automation, UAV control, and AR are examples of those services. Services such as UAV control will require more precise positioning information that includes altitude, speed, and direction, in addition to horizontal coordinates.

Support for Massive IoT (MIoT) brings many new requirements in addition to those for the enhanced KPIs. The expansion of connected things introduces a need for significant improvements in resource efficiency in all system components (e.g., UEs, IoT devices, radio, access network, core network). The 5GS also aims to enhance its capability to meet KPIs that emerging V2X applications require. For these advanced applications, the requirements, such as data rate, reliability, latency, communication range and speed, are made more stringent.

The proliferation of video services, ad-hoc multicast/broadcast streams, software delivery over wireless, group communications and broadcast/multicast IoT applications have created a need for a flexible and dynamic allocation of radio resources between unicast and multicast services within networks as well as support for stand-alone deployment of multicast/broadcast networks. Moreover, enabling such a service over a network for a wide range of inter-site distances between base stations will enable a more efficient and effective delivery system for real-time and streaming multicast/broadcast content over wide geographic areas as well as in specific geographic areas spanning a limited number of base stations. A flexible multicast/broadcast service will allow the 5GS to efficiently deliver such services.

In particular, one requirement for the 5G network is to support parallel transfer of multiple quality levels (e.g., video resolutions) of broadcast/multicast content for the same user service to the same UE taking into account, for example, UE capability, radio characteristics, application information, etc. (see e.g., 3GPP TS 22.261 v17.0.1 (2019 Oct. 3) ("[TS22261]")).

In support the aforementioned requirement, the 3GPP working group (WG) Service and System Aspects—Architecture (SA2) has started the study for release (Rel)-17 on 5GS to support architectural enhancements for 5G multicast-broadcast services (see e.g., 3GPP TR 23.757 v0.1.0 (2019 Oct. 29) ("[TR23757]")), which has identified the following issue:

Different multicast and broadcast communication services have potentially different QoS requirements. For this issue, the Quality of Service (QoS) framework of clause 5.7 of 3GPP TS 23.501 v16.2.0 (2019 Oct. 24) ("[TS23501]") is taken as baseline. This issue aims at studying QoS requirements, including packet error rate, delay budget, MBR or GBR; if a need for different QoS levels is determined by the QoS requirement analysis: how to provide a means to support the identified QoS levels; which NF determines the QoS levels of multicast and broadcast services; and which entity enforces the required QoS and how.

In addition, the QoS levels of Multicast-Broadcast Services (MBS) may be differentiated based on different factors of the UEs: User's application subscription with the MBS application service provider, e.g. 1080p resolution or 4 k video; UE's subscription for the MBS service in 5GS, e.g. Max Bit Rate=50 Mbps, 500 Mbps, etc.; and/or UE's 5G capability.

Figure 5:
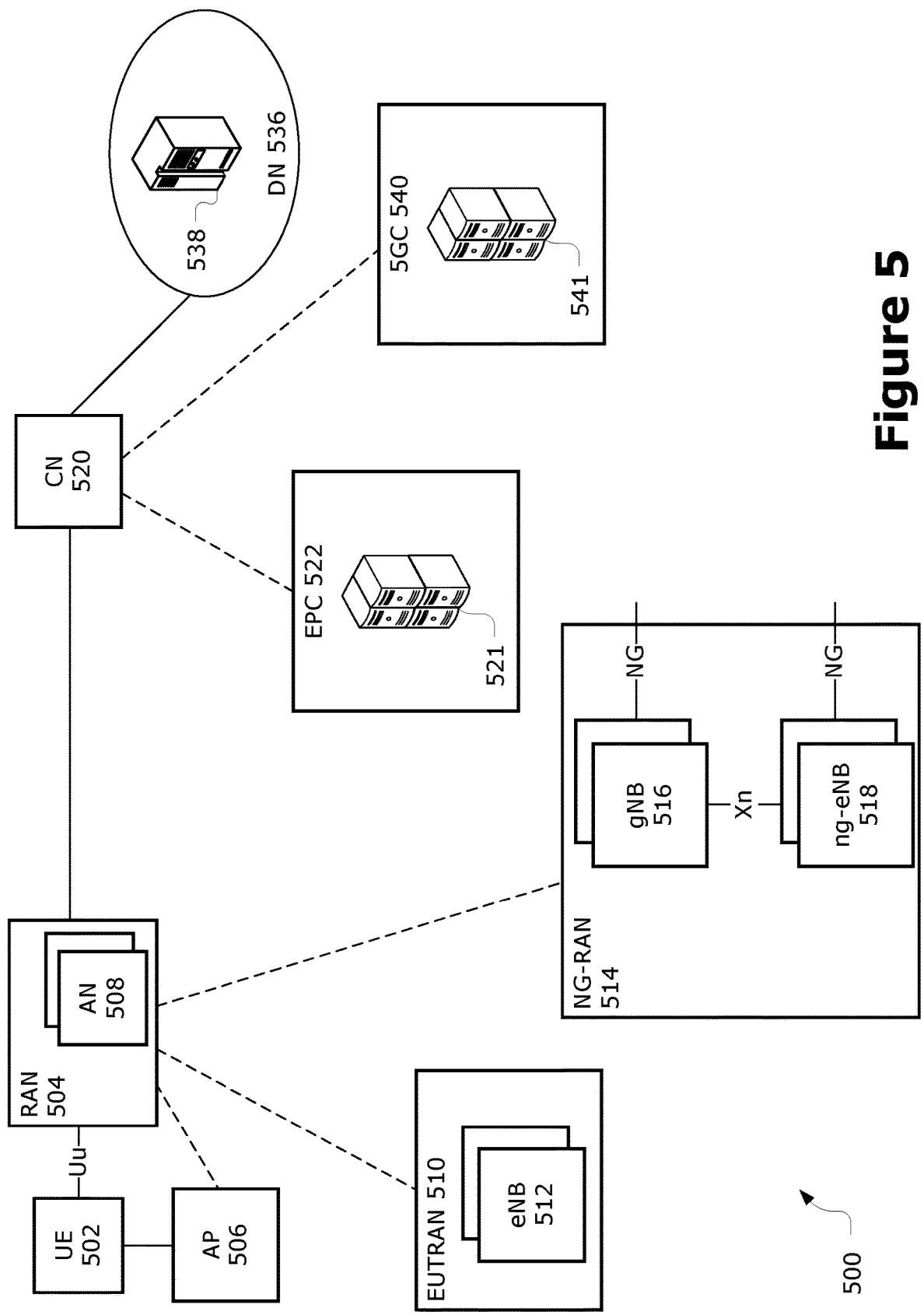
FIG. 5 illustrates an example network architecture according to various embodiments.

As such, differentiated QoS for MBS may need to be provisioned for UEs (e.g., UE 502 of FIG. 5). The present disclosure provides embodiments for MBS session requests between an MBS application server (AS) (e.g., app server 640 of FIG. 6) and a network entity in the 5GS; mechanisms to request differentiated (diff) QoS; mechanisms to update MBS group ID to the UE; mechanisms to configure MSB reporting from UE; and mechanisms to configure MBS session schedule with diff QoS.

1. Architectural Aspects

Figure 1B:
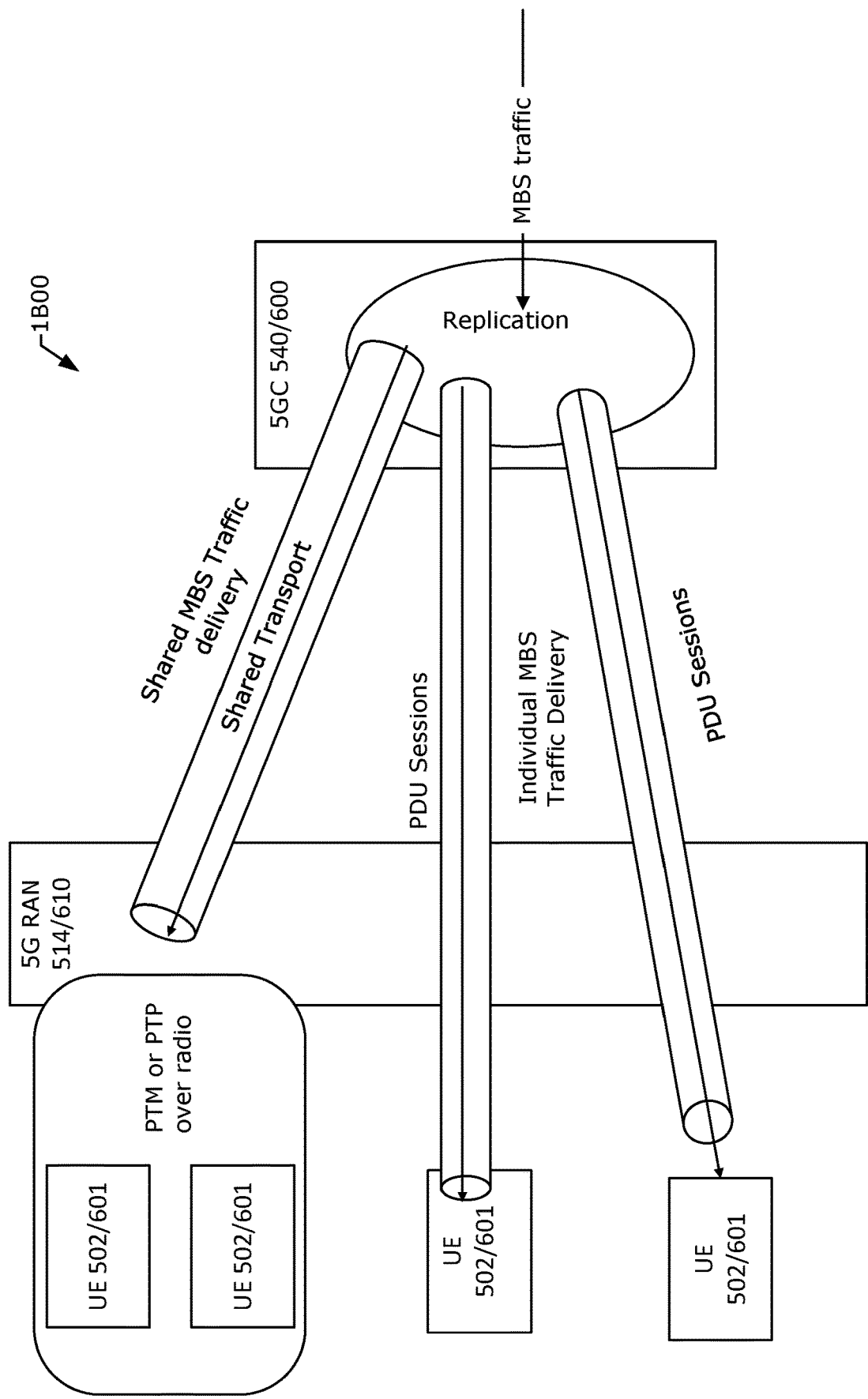
FIG. 1B illustrates example Multicast-Broadcast Services (MBS) delivery methods according to various embodiments.

FIG. 1A shows an example 5GS architecture 1A00 for integrated Multicast transport with unicast according to various embodiments. The 5GS architecture 1A00 enhances the existing 5GS network functions (NFs), NG-RAN 514/610, and UE 502 currently only supporting unicast transport, to support Multicast transport. FIG. 1B shows various MBS delivery methods 1B00 according to various embodiments.

Figure 6:
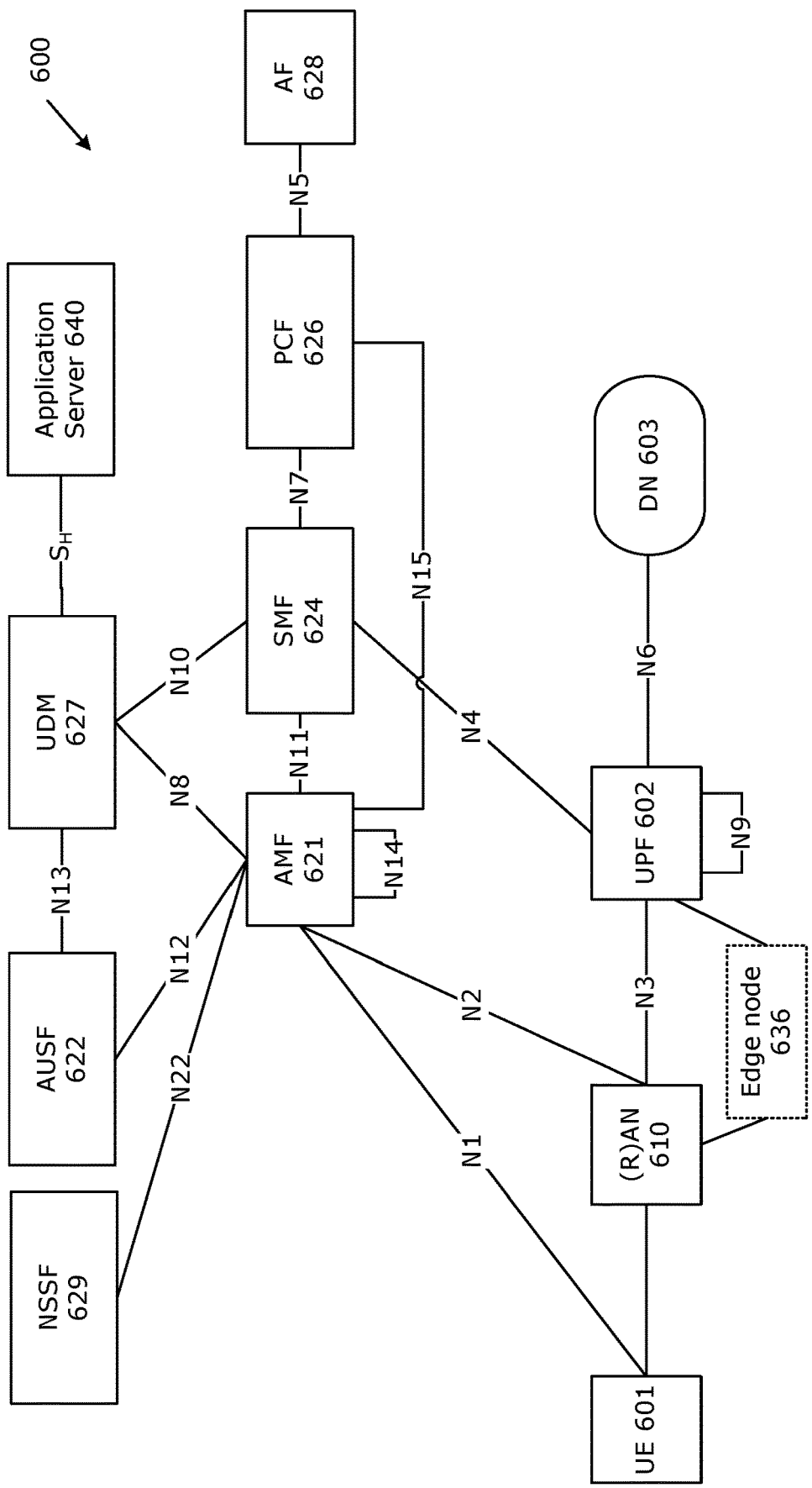
FIGS. 6 and 7 illustrate example core network architectures according to various embodiments.

Various aspects of the elements shown by FIGS. 1A and 1B are discussed infra with respect to FIGS. 5 and 6. In addition to the functionality discussed infra, The following new functionality is added to the current AF 628, 5GC NFs, NG-RAN 610, and UE 601, etc.:

The AF 628 supports MBS service functions, negotiation with NEF 623 for service exposure. The NEF 623 supports 5G MBS service exposure; and negotiation of 5G MBS service with AF 628, including QoS, 5G MBS service area. The PCF 626 supports policies for Multicast services, including QoS parameters and/or QoS profiles; provides policy information regarding the MBS session to SMF 624; and receives MBS service information from AF 628, directly (operator owned) or indirectly via the NEF 623. In some embodiments, it is possible to establish multicast transport without interaction with NEF 623.

A QoS Flow may either be 'GBR' or 'Non-GBR' depending on its QoS profile. Each QoS profile has one corresponding QoS Flow identifier (QFI) which is not included in the QoS profile itself. The QoS profile of a QoS Flow is sent to the (R)AN 508 and it contains QoS parameters as described in [TS23501] clause 5.7.2. For example, for each QoS Flow, the QoS profile includes the following QoS parameters: a QoS Identifier (5QI) and an Allocation and Retention Priority (ARP). For each Non-GBR QoS Flow, the QoS profile may also include the following QoS parameter: Reflective QoS Attribute (RQA). For each GBR QoS Flow, the QoS profile also includes the following QoS parameters: Guaranteed Flow Bit Rate (GFBR)—UL and DL; and Maximum Flow Bit Rate (MFBR)—UL and DL. In the case of a GBR QoS Flow only, the QoS profile may also include one or more of the following QoS parameters: notification control and Maximum Packet Loss Rate—UL and DL. Additionally or alternatively, the QoS parameters may include a QoS Class Identifier (QCI), Guaranteed Bit Rate (GBR), Maximum Bit Rate (MBR), Aggregate MBR (AMBR), per APN/DN AMBR, per UE AMBR, packet error rate, packet loss rate, delay budget, jitter tolerance, and/or the like.

The SMF 624 controls of MBS transport, based on received MBS policies from the PCF 626; configuration of the UPF for MBS flows and for point to point or point-to-multipoint transfer; configuration of the RAN for MBS flows and QoS information; and SM configuration at the UE 601 for MBS flows. The SMF 624 may be used for both unicast and MBS. The UPF 602 supports packet filtering of MBS flows, and delivery of MBS flows to RAN via point to point or point-to-multipoint N3; receives 5G MBS flow configuration from SMF 624; and detection of IGMP packets and notification to SMF 624 (if UE joining is performed via IGMP). The UPF 602 may receive both unicast and MBS flows. I-UPF(s) may be used for the delivery of MBS flows from the UPF attached to N6 to NG-RAN 610; the N9 interface can be used for MBS traffic delivery. An I-UPF may be used for individual delivery, but not for shared delivery.

The NG-RAN 610 supports reception of MBS flows via N3 and delivery over-the-air; switches between multicast and unicast delivery of MBS flows; and UEs configuration for MBS flow reception at AS layer. The UE 601 supports UE policy configuration extension to MBS; supports SM extension for MBS flows; signalling for joining MBS flow (via SM signalling or user plane IGMP Join), and MBS support at AS layer.

Orthogonal to the description of the multicast flow user plane model shown and described with respect to FIG. 1A, a service layer can be supported on top. The service layer is fully separate from the Multicast transport. This allows for applications that do not require a service layer to establish a multicast transport directly via Neff (control plane and N6 (user plane data). In one example, service layer support of multicast/broadcast uses xMB/MB2 as entry point. A new Network Function, called a Multicast Service Function (MSF) may be introduced to provide service layer functionality and requests the 5G system (via Npcf or Nnef) for the underlying Multicast transport necessary for the Multicast service.

The MSF has the following functionality: entry point for both control plane service layer signaling and user plane data, e.g. xMB/MB2 where interaction can happen directly with external AF or via NEF 623; MSF Control Plane (MSF-C) including multicast service configuration, MBS service level management, xMB-C/MB2-C termination, and codec configuration (if needed); and MSF User Plane (MSF-U) including xMB-U/MB2-U termination, encoding of data at service layer, and multicast service layer data packets delivery via N6.

The MBS architecture (e.g., architecture 1A00) may provide an efficient transport for a variety of multicast and broadcast services. The sequence to establish and deliver an MBS session may be as follows: (1) Optional delivery of 5G MBS service info from application/service layer to 5GC. A framework to deliver 5G MBS service info to 5GC 540/600 is available. However, this step may be replaced by pre-agreements without explicit signalling. (2) UEs 502 participate in receiving MBS flow wherein a UE 502 requests to join an MBS session (for Multicast session). (3) Establishment of MBS flow transport, which may or may not take place before step 2 for individual UEs 502 joining an MBS session which is already started. (4) MBS data delivery to UEs 502. (5) UEs 502 stop receiving MBS flow (for Multicast session). (6) Release of MBS flow transport (what used to be session stop).

MBS traffic is delivered from a single data source (e.g., Application Service Provider such as application (app) server 640 of FIG. 6) to multiple UEs 502. Depending on many factors, multiple delivery methods may be used to deliver MBS traffic in the 5GS. The term "unicast delivery" refers to a mechanism by which application data and signaling between the UE 502 and the app server 640 are delivered using PDU Session within the 3GPP network and using individual UE 502 and app server 640 addresses (e.g. IP addresses) between the 3GPP network and the app server 640. It is not equivalent to 5GC Individual MBS traffic delivery method discussed infra and/or defined in [TR23757].

From the view point of 5GC 540/600, two delivery methods are possible for MBS multicast service: (1) 5GC Individual MBS traffic delivery method, and (2) 5GC Shared MBS traffic delivery method. The 5GC Individual MBS traffic delivery method involves the 5GC 540/600 receives a single copy of MBS data packets and delivers separate copies of those MBS data packets to individual UEs via per-UE PDU sessions, hence for each such UE one PDU session is required to be associated with a multicast session. The 5GC Shared MBS traffic delivery method involves the 5GC 540/600 receives a single copy of MBS data packets and delivers a single copy of those MBS packets packet to a RAN node 508, which then delivers them to one or multiple UEs 502. If 5GC Individual MBS traffic delivery method is supported, a same received single copy of MBS data packets by the CN 540/600 may be delivered via both 5GC Individual MBS traffic delivery method for some UE(s) 502 and 5GC Shared MBS traffic delivery method for other UEs 502.

From the viewpoint of RAN 514/610, (in the case of the shared delivery) two delivery methods are available for the transmission of MBS packet flows over radio: (1) Point-to-Point (PTP) delivery method and (2) Point-to-Multipoint (PTM). The PTP delivery method involves a RAN node 508 delivering separate copies of MBS data packet over radio to individual UE 502. The PTM delivery method involves a RAN node 508 delivering a single copy of MBS data packets over radio to a set of UEs 502. A RAN node 508 may use a combination of PTP/PTM to deliver an MBS packet to UEs 502. The PTP and PTM delivery methods are defined in RAN WGs and they are listed here for reference only. As depicted by FIG. 1B, PTP or PTM delivery (with 5GC shared delivery method) and 5GC Individual delivery method may be used at the same time for a multicast MBS session.

Figure 7:
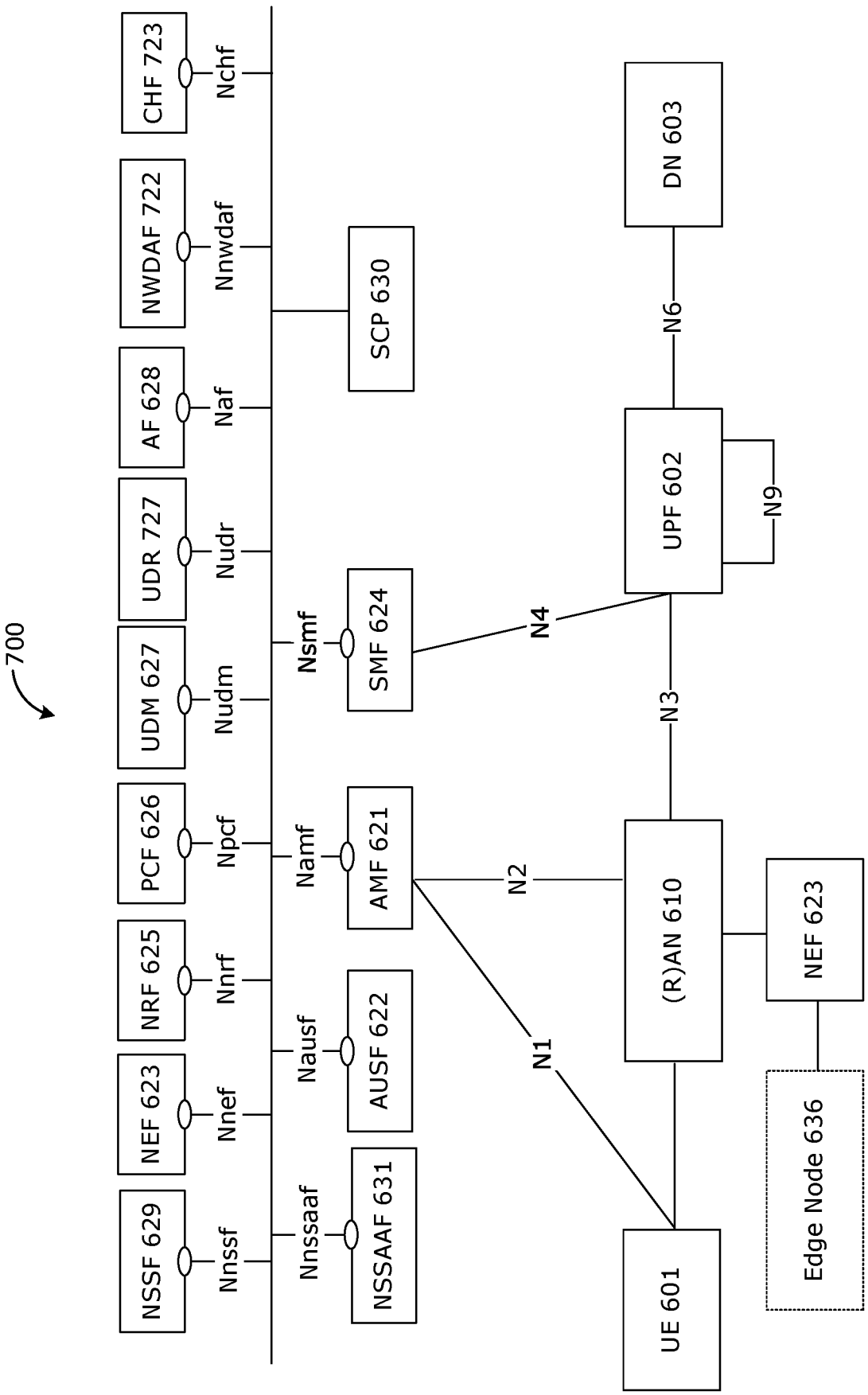
Figure 8:
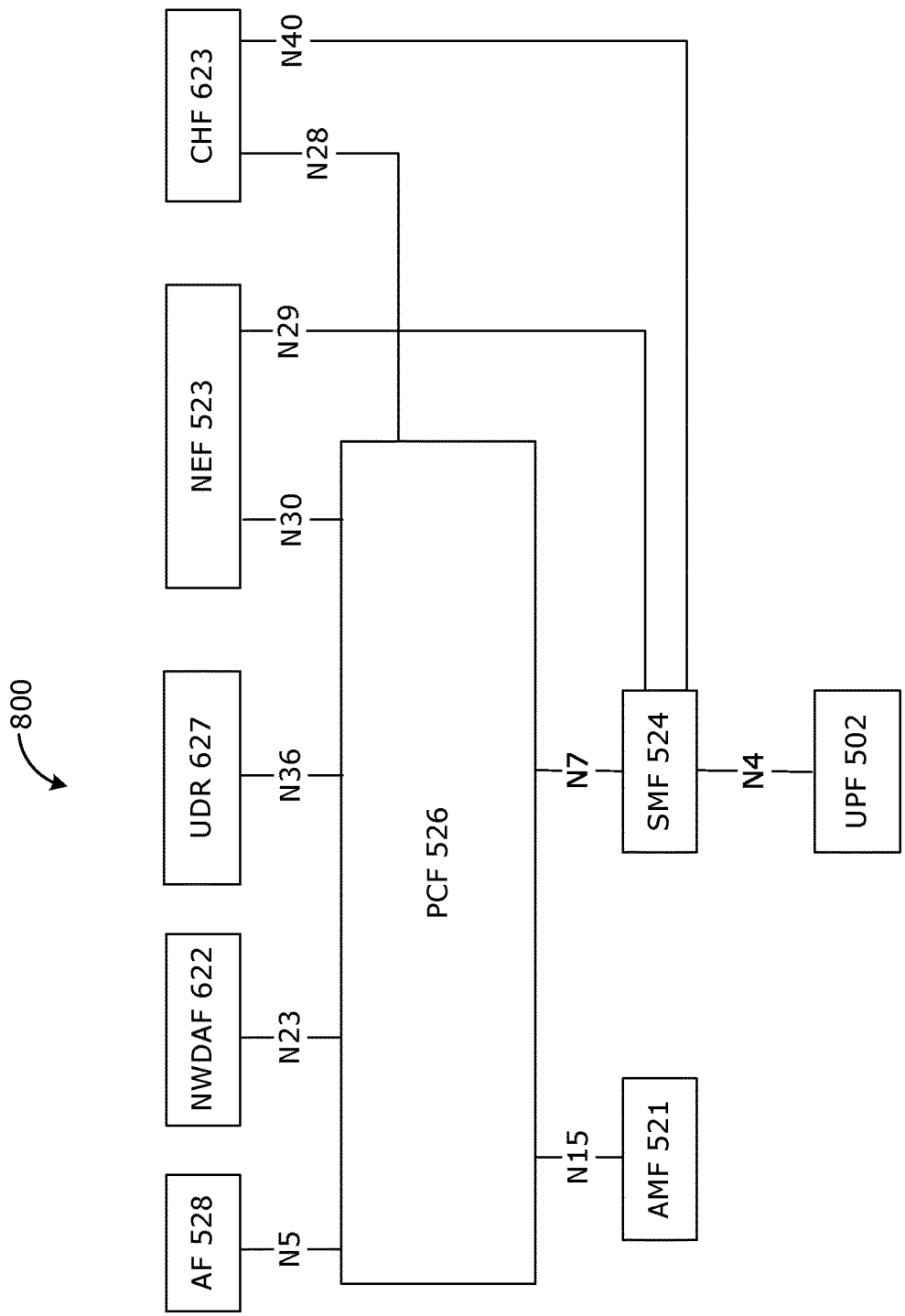
FIG. 8 shows an example reference point representation of a reference architecture of policy and charging control framework for a 5GS.

FIG. 7 shows an example service based representation of a 5GS 700 and FIG. 8 shows a reference point representation of a reference architecture 800 of a policy and charging control framework for the 5GS. As shown by FIGS. 7 and 8, the reference architecture of the policy and charging control framework for the 5GS comprises a Policy Control Function (PCF) 626, Session Management Function (SMF) 624, the User Plane Function (UPF) 602, Access and Mobility Management Function (AMF) 621, Network Exposure Functionality (NEF) 623, Application Function (AF) 628, a Network Data Analytics Function (NWDAF) 722, a Charging Function (CHF) 723, and a Unified Data Repository (UDR) 727. Various aspects of these network functions (NFs) are discussed in more detail infra with respect to FIG. 7. The N4 reference point is not part of the 5G Policy Framework architecture but shown in the figures for completeness. How the PCF 626/NEF 623 stores/retrieves information related with policy subscription data or with application data is discussed in [TS23501] and elsewhere in the present disclosure. The Nnwdaf interface is a service-based interface exhibited by NWDAF 722. The Nchf interface is a service-based interface exhibited by CHF 723. The Nchf service for online and offline charging consumed by the SMF 624 is discussed in 3GPP TS 32.240 v16.0.0 (2019 Mar. 28) ("[TS32240]"). The Nchf service for Spending Limit Control consumed by the PCF 626 is discussed in 3GPP TS 23.502 v16.2.0 (2019 Sep. 24) ("[TS23502]").

Figure 2:
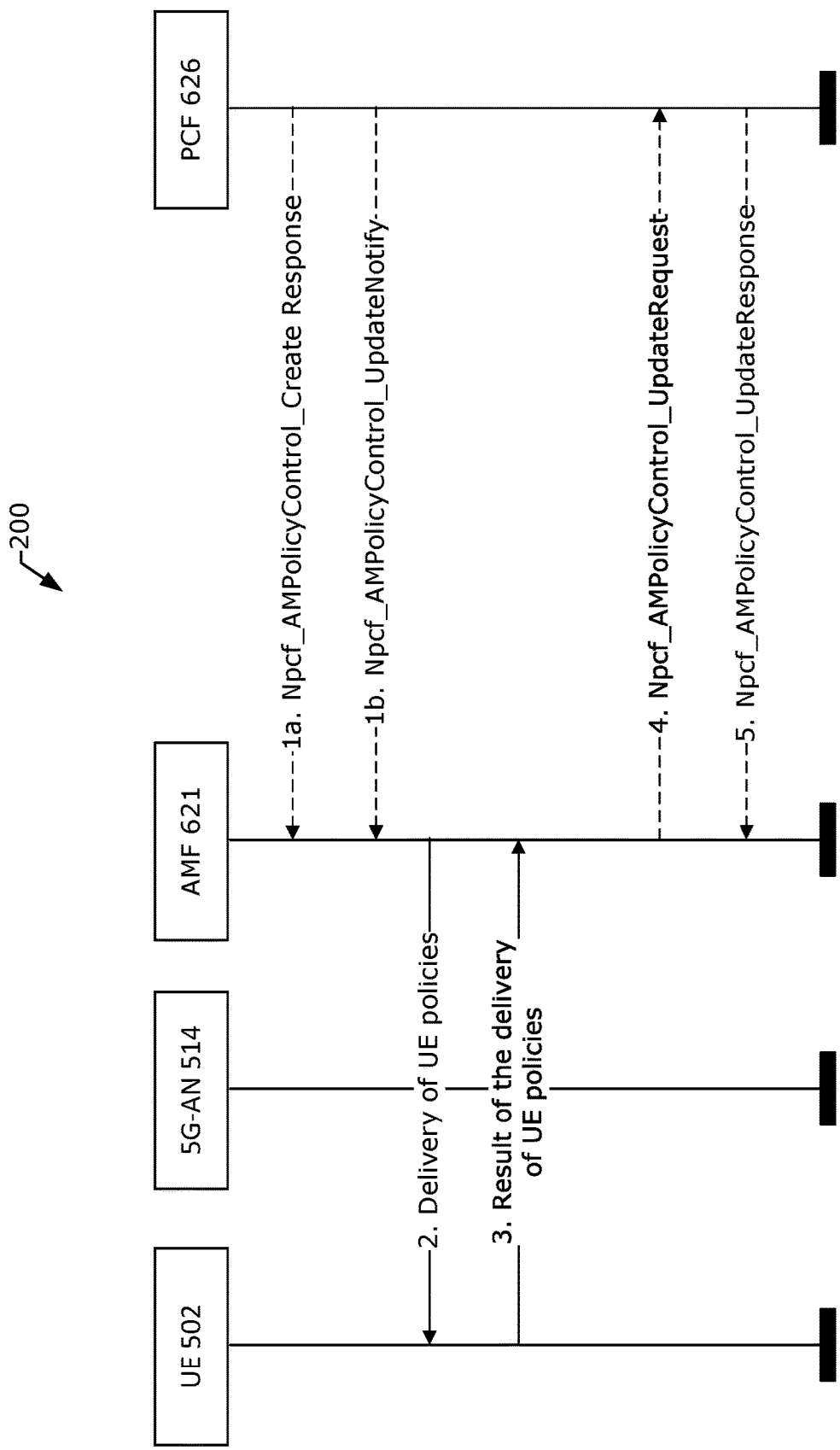
FIGS. 2 and 3 illustrate example UE Configuration Update procedures for transparent UE Policy delivery according to various embodiments.
Figure 3:
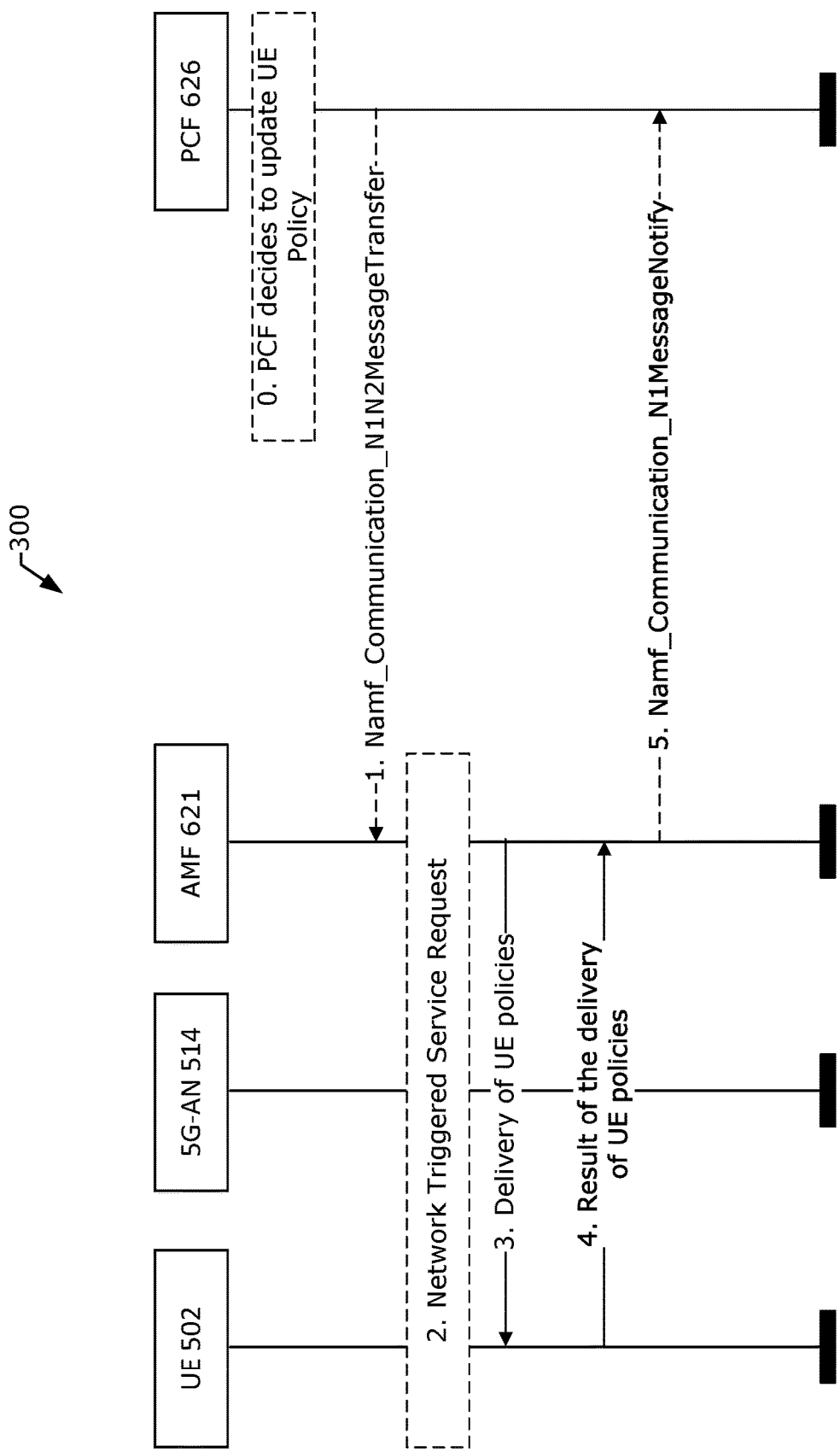

FIG. 2 shows an example UE Configuration Update procedure 200 according to some embodiments, and FIG. 3 shows an example procedure 300 for transparent UE Policy delivery according to various embodiments. The procedures 200 and 300 may be initiated when the PCF 626 wants to update UE policy information (e.g., UE policy) in the UE configuration. In the non-roaming case the visiting PCF (V-PCF) is not involved and the role of the home PCF (H-PCF) is performed by the PCF 626. For the roaming scenarios, the V-PCF interacts with the AMF 621 and the H-PCF interacts with the V-PCF.

Procedure 200 illustrates how a UE policy can be delivered from the PCF 626 to the UE 502 by using the UE Configuration Update procedure. Procedure 200 begins at step 1a where the PCF 626 invokes Npcf_AMPolicyControl_Create Response to the AMF 621, and at step 1b, the PCF 626 invokes Npcf_AMPolicyControl_UpdateNotify to the AMF 621. At step 2, the AMF 621 delivers UE policies to the UE 502, and at step 3, the UE 502 provides a result of the delivery of the UE policies to the AMF 621. At step 4, the AMF 621 invokes Npcf_AMPolicyControl_UpdateRequest to the PCF 626, and at step 5, the PCF 626 invokes Npcf_AMPolicyControl_UpdateResponse to the AMF 621.

Procedure 300 begins at step 0 where the PCF 626 decides to update UE policy based on triggering conditions such as an initial registration, registration with 5GS when the UE 502 moves from EPS to 5GS, or need for updating UE policy as follows: For the case of initial registration and registration with 5GS when the UE 502 moves from EPS to 5GS, the PCF 626 compares the list of PSIs included in the UE policy information in Npcf UEPolicyControl Create request and determines, as described in clause 6.1.2.2.2 of 3GPP TS 23.503 v16.2.0 (2019 Sep. 24) ("[TS23503]"), whether UE policy information have to be updated and be provided to the UE 502 via the AMF 621 using DL NAS TRANSPORT message; and For the network triggered UE policy update case (e.g. the change of UE location, the change of Subscribed S-NSSAIs as described in clause 6.1.2.2.2 of [TS23503]), the PCF 626 checks the latest list of PSIs to decide which UE policies have to be sent to the UE 502.

The PCF 626 checks if the size of the resulting UE policy information exceeds a predefined limit: If the size is under the limit, then UE policy information are included in a single Namf_Communication_N1N2MessageTransfer service operation as described below. If the size exceeds the predefined limit, the PCF 626 splits the UE policy information in smaller, logically independent UE policy information ensuring the size of each is under the predefined limit. Each UE policy information will be then sent in separated Namf_Communication_N1N2MessageTransfer service operations as described below. NAS messages from AMF 621 to UE 502 do not exceed the maximum size limit allowed in NG-RAN 610 (PDCP layer), so the predefined size limit in PCF 626 is related to that limitation. The mechanism used to split the UE policy information is described in 3GPP TS 29.507 v16.1.0 (2019 Sep. 27).

At step 1, the PCF 626 invokes Namf_Communication_N1N2MessageTransfer service operation provided by the AMF. The message includes SUPI, UE Policy Container.

At step 2, if the UE 502 is registered and reachable by AMF 621 in either 3GPP access or non-3GPP access, AMF 621 transfers transparently the UE Policy container to the UE 502 via the registered and reachable access.

If the UE 502 is registered in both 3GPP and non-3GPP accesses and reachable on both access and served by the same AMF 621, the AMF 621 transfers transparently the UE Policy container to the UE 502 via one of the accesses based on the AMF local policy.

If the UE 502 is not reachable by AMF 621 over both 3GPP access and non-3GPP access, the AMF 621 reports to the PCF 626 that the UE Policy container could not be delivered to the UE 502 using Namf_Communication_N1N2TransferFailureNotification as in the step 5 in clause 4.2.3.3 of [TS23502].

If AMF 621 decides to transfer transparently the UE Policy container to the UE 502 via 3GPP access, e.g. the UE 502 is registered and reachable by AMF 621 in 3GPP access only, or if the UE 502 is registered and reachable by AMF 621 in both 3GPP and non-3GPP accesses served by the same AMF 621 and the AMF 621 decides to transfer transparently the UE Policy container to the UE 502 via 3GPP access based on local policy, and the UE 502 is in CM-IDLE and reachable by AMF 621 in 3GPP access, the AMF 621 starts the paging procedure by sending a Paging message described in the step 4b of Network Triggered Service Request (in clause 4.2.3.3 of [TS23502]). Upon reception of paging request, the UE 502 initiates the UE Triggered Service Request procedure (clause 4.2.3.2 of [TS23502]).

At step 3, if the UE 502 is in CM-CONNECTED over 3GPP access or non-3GPP access, the AMF 621 transfers transparently the UE Policy container (UE policy information) received from the PCF 626 to the UE. The UE Policy container includes the list of Policy Sections as described in [TS23503].

At step 4, the UE 502 updates the UE policy provided by the PCF 626 and sends the result to the AMF.

At step 5, if the AMF 621 received the UE Policy container and the PCF 626 subscribed to be notified of the reception of the UE Policy container then the AMF 621 forwards the response of the UE 502 to the PCF 626 using Namf_Communication_N1MessageNotify.

The PCF 626 maintains the latest list of PSIs delivered to the UE 502 and updates the latest list of PSIs in the UDR 727 by invoking Nudr_DM_Update (SUPI, Policy Data, Policy Set Entry, updated PSI data) service operation.

If the PCF 626 is notified about UE Policy delivery failure the PCF 626 may initiate UE Policy Association Modification procedure to provide a new trigger "Connectivity state changes" in Policy Control Request Trigger of UE Policy Association to AMF 621 as defined in clause 4.16.12.2 of [TS23502]. For backward compatibility the PCF 626 may subscribe the "Connectivity state changes (IDLE or CONNECTED)" event in Rel-15 AMF 621 as defined in clause 5.2.2.3 of [TS23502].

2. Embodiments for Provisioning Multicast and Broadcast Service with Different QOS Levels The present disclosure provides embodiments to allow the 5GS to configure the MBS sessions based on the QoS conditions of the receptions of MBS session of the UEs 502 (subscribers). As such, the 5GS is able to provide differentiated QoS flows in the MBS session to the UEs 502, which may have different service subscription in 5GS and user subscriptions in MBS Application. Currently, there are no existing solutions for MBS service provisioning in 5GS. In EPS, the UE 502 does not interact with the network related to reception of the MBS.

The following embodiment are discussed herein for provision differentiated QoS for MBS in 5GS: MBS session request between an MBS AS (e.g., AS 6240 and/or AF 628) and one or more 5GS network entities; method to request diff QoS; method to update MBS group ID to the UE 502; method to configure MSB reporting from UE 502; and method to configure MBS session schedule with diff QoS. The embodiments may include the following assumptions: the MBS application server can interface with 5GC via AF (application function), and an MBS session type is supported for a PDU session which is used to transport MBS traffic from an UPF terminating a data network at N6 interface and a NG-RAN node (gNB 516 or ng-eNB 518 of FIG. 5).

2.1. Embodiment 1: MBS Session Request Between MBS AS/AF and 5GS NF(S)

This embodiments is used to manage an MBS session with different QoS parameters associated with an MBS external group. For each MBS service, identified using an MBS application identifier (App-ID), there are one or more MBS groups for an MBS service. Each user in an MBS group may require the same set of QoS parameters. The QoS parameters associated with an MBS external group and/or MBS session may be the same or similar to the QoS parameters mentioned previously.

As an example, the relationship of various parameters are as follows: For an MBS session requiring a specific set of QoS parameters, a group of UEs 502 can be identified by an external group identifier with same MBS application service subscription which required the same set of QoS parameters. That is, there is an association between the external group identifier and the corresponding QoS policy. Additionally, one or more MBS groups may be further divided into small groups (identified by MBS group ID) by the 5GC 540, and each MBS group ID is associated with a group of UEs 502 (each is identified by Generic Public Subscription Identifier (GPSI)) within the requested Group (external group ID) based on individual UE's 502 service subscription.

Figure 4:
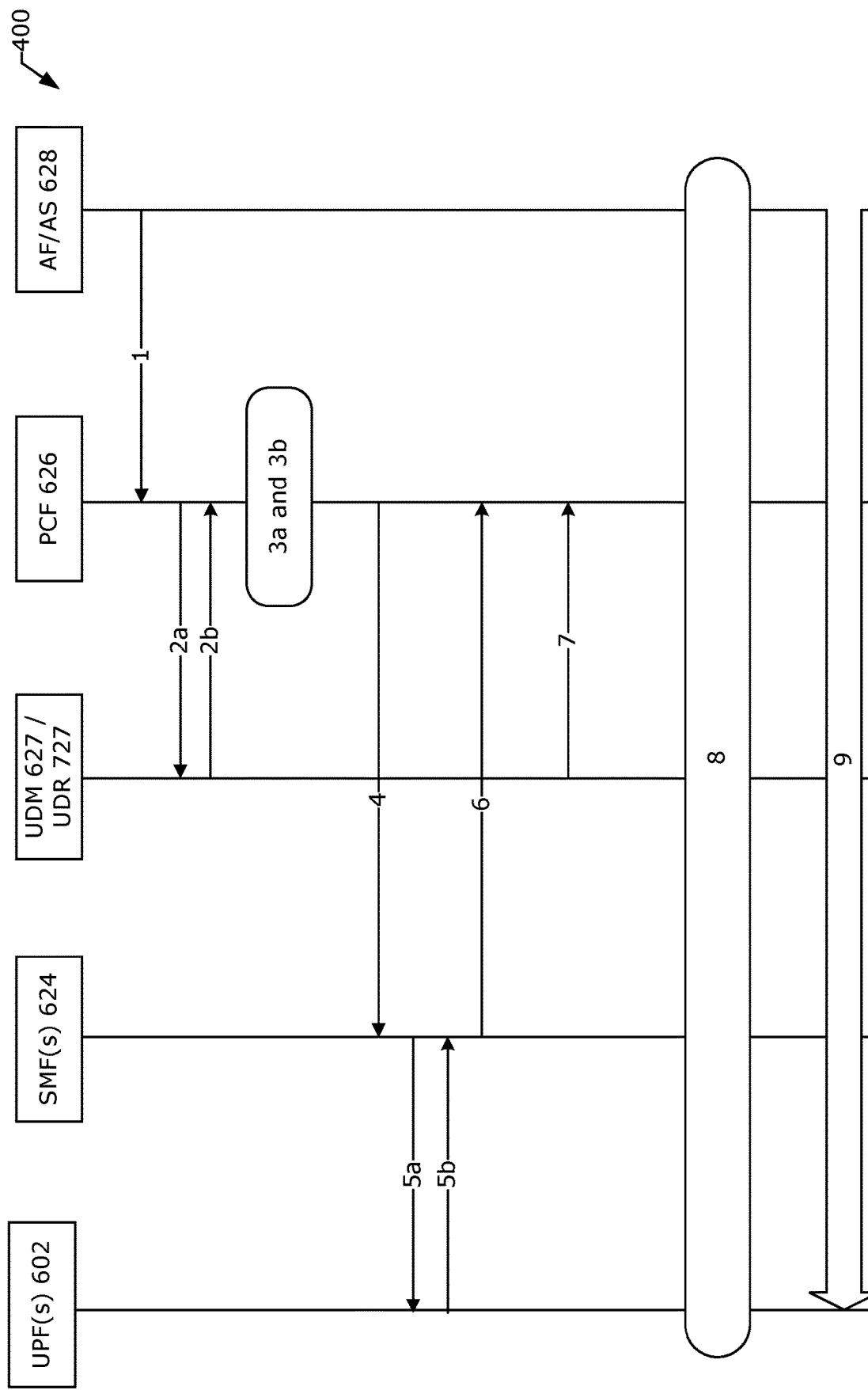
FIG. 4 illustrates an example procedure for practicing various embodiments discussed herein.

FIG. 4 shows an example procedure 400 for practicing embodiment 1, according to various embodiments. Procedure 400 begins at operation 1 [MBS AS 628→PCF 626]: MBS session establishment request (App-ID, external group ID, QoS parameters, service areas). The MBS AS 628 requests MBS service to PCF 626 directly or via NEF 623 in 5GC 600 for establishing a MBS session, in which the message includes external group ID, App ID, QoS parameters of the MBS session, and requested service areas, wherein the QoS parameters includes packet error rate, delay budget, MBR, and/or GBR.

Operation 2a [PCF 626→UDR 727/UDM 627]: Auth request (App-ID, external group ID, service areas). Operation 2b [UDR 727/UDM 627→PCF 626]: Auth response (QoS group list per service areas). Here, at operation 2a the PCF 626 sends a request to the UDR 727/UDM 627 to check the authorization of the MBS AS 628 for the MBS services and the service subscription of the external group identifier and subscribed service of each UE 502 associated to the external group ID. The Authorization request message includes information of App-ID, external group ID, service areas and the Authorization response message (from UDR 727/UDM 627) includes QoS group list per service area whereby the QoS group list contains UEs' 502 identities (e.g., SUPIs).

Operation 3a [PCF 626]: the PCF 626 contacts NRF 625 (not shown by FIG. 4) to select one or more SMFs 624 with service areas information. Operation 3b [PCF 626]: the PCF 626 allocates MBS group ID based on QoS group list and service areas. With the SMFs 624 information, the PCF 626 in operation 3b allocates one or more MBS group IDs to regroup the UEs per service area based on the information obtained from UDM/UDR 727.

Operation 4: [PCF 626→SMF 624]: MBS session establishment request (MBS group ID(s), QoS parameters per group). Here, the PCF 626 provides MBS group ID and corresponding QoS policies of each MBS group to the SMF 624. When the SMF 624 obtains QoS policies from PCF 626, the SMF 624 establishes an MBS session by configuring a UPF 602 with corresponding QoS policies with QoS parameters for one or more MBS QoS flow, in which each MBS QoS flow is associated to a MBS group ID. That is, for an MBS App-ID, a UPF 602 may configure one MBS session with multiple QoS flows (identified by different QoS flow ID) with different set of QoS parameters. In this step, a QoS flow ID is associated with the MBS group ID. In addition, the SMF 624 can determine if adding PSA (PDU session anchor) connecting to the UPF 602 capable of MBS for the MBS sessions by fulfilling the QoS policies of some MBS QoS flows.

Operation 5a [SMF 624→UPF 602]: N4 Session Establishment Request. Operation 5b [SMF 624←UPF 602]: N4 Session Establishment Response. Here, the SMF 624 configures one or more UPFs 602 and returns corresponding Data Network Access Identifiers (DNAIs) to the PCF 626 using N4 session establishment request/response messages.

Operation 6: [SMF 624→PCF 626]: MBS session establishment response (MBS group ID(s), DNAI(s)). Here, the SMF 624 replies/provides an MBS session establishment response message including MBS group ID(s) and its corresponding DNAI(s) to PCF 626. For each MBS App-ID, the PCF 626 stores MBS session information of one QoS flow as follows:

MBS App-ID
MBS group ID
   associated QoS policy with QoS parameters
   DNAI for the downlink UPF session from MBS AS 628.

There may be one or more MBS group IDs allocated by the PCF 626.

Operation 7: [PCF 626→MBS AS 628]: MBS session establishment response (App-ID, external group ID, MBS group ID(s), QoS group list, DNAI(s) per group). The PCF 626 replies to the MBS AS 628 with the information of app-ID, external group ID, MBS group IDs with associated UEs' Identities (GPSIs) in QoS group list, and the DNAI per group. The allocation of MBS group ID may be updated based on operator's policies for security and privacy consideration and when there is a changes of the UE's service subscriptions.

Operation 8: [UE 502←MBS AS 628]: MBS AS 628 announces MBS session schedules to members' UEs 502 based on MBS group ID(s). The MBS AS 628 announces the MBS session schedules, including the information of the MBS App-ID, and the user's allocated MBS group ID, to each subscribers of the service.

Operation 9: [UE 502←MBS AS 628]: MBS traffic delivery. Here, the MBS AS 628 performs MBS traffic delivery via corresponding DNAIs to the UPF 602, and the UE 502 receives the MBS radio corresponding to its MBS group ID.

The same procedure can be used for a new joined user member. In this case, external identifier of the UE 502 is used and the PCF 626 may allocate a new MBS group ID or use an existing one to this UE 502 and include this UE 502 in the group with the same MBS group ID.

2.2. Embodiment 2: Diff QoS Handling in 5GC

Following embodiment 1, the interaction between the PCF 626 and the impacted RAN node 508 are as follows.

Operation 1: the PCF 626 stored with MBS group policies initiates MBS service invites request with selected QoS profiles to each impacted RAN node 508 of its UE's members.

Operation 2: the RAN node 508 provides its confirmation to join the MBS service, wherein each MBS QoS profiles containing one or more QoS flow IDs, QoS parameters.

Operation 3: the RAN node 508 schedules the radio resources for MBS session associated with each MBS group, including frequency, duration, etc., for announcing the MBS group policy.

Operation 4, option (1): the information may be replied to the PCF 626 via SMF 624. The PCF 626 further stores the MBS group policy with MBS session schedules. Operation 4, option (2): the information is stored locally at the RAN node 508 along with associated MBS group ID. Options 1 and 2 for operation 4 may be combined in some embodiments.

2.3. Embodiment 3: Providing MBS Group ID to the UE

Following operations 7-8 in embodiment 1, embodiment 3 further provides MBS group ID to the UE 502 as subscriber within the external group identifier.

2.3.1. Application Layer

In this embodiment, the MBS AS 628 provides the information about MBS sessions to its user members, which may include one or more of: MBS group ID; MBS App-ID; and/or schedule of the subscribed MBS session including frequency, start/stop time, duration, etc. The MBS AS 628 provides the information to its registered user members individually in application layer. This embodiment may require the PCF 626 to provide MBS session radio info provided by the RAN nodes 508.

2.3.2. Use UE Configuration Update Procedure to Configure the UE Via PCF

Operation 1: The MBS AS 628 requests for provisioning group policy for each of its member UE of the group to PCF 626 directly or via NEF 623 with MBS service parameters, wherein the request message includes the following information: MBS App-ID; MBS group ID; and/or MBS group policy for the MBS session schedules (start/stop time).

Operation 2: The PCF 626 stores the group policy associated with the MBS group ID and MBS App-ID.

Operation 3: The PCF 626 initiates UE configuration Update request procedure for each indicated UE, whereby the request message includes the information: MBS App-ID; MBS group ID; and/or MBS group policy for the MBS schedules (start/stop time, radio resource settings for the MBS session including frequency, time frames, etc.).

This embodiment may require the PCF 626 to provide MBS session radio info provided by the RAN nodes 508 and store the corresponding changes in the RAN node 508 via RAN node reporting procedure.

2.3.3. Use New Sib for MBS or a New MBS Broadcast Mechanism to Broadcast Group Policy Operation 1: The MBS AS 628 provides information about MBS sessions to its user members: which may include, for example, MBS group ID; MBS App-ID; and/or MBS session schedules (start/stop time).

Operation 2: The MBS AS 628 requests for provisioning group policy for each of its member UE of the group to PCF 626 directly or via NEF with MBS service parameters, wherein the request message includes the following information: MBS App-ID; MBS group ID; and/or MBS group policy for the MBS session schedules (start/stop time).

Operation 3: The PCF 626 stores the group policy associated with the MBS group ID and MBS App-ID.

Operation 4: The PCF 626 requests to enforce the MBS group policies to all impacted RAN nodes 508 with the following information to announcing the MBS session: MBS App-ID; MBS group ID; and/or MBS group policy for the MBS schedules (start/stop time).

Operation 5: The RAN nodes 508 broadcast the MBS session schedule as follows: indicate the MBS group ID for the UE 502 to identify its corresponding broadcasting MBS session information of the MBS App-ID including radio resource settings for the MBS session including frequency, time frames. etc.

The RAN node 508 can broadcasts one or more MBS session schedules in the MBS specific frequency/time slots.

2.4. Embodiment 4: MSB Reporting

In this embodiment, the MBS AS 628 requests MBS QoS monitoring (or MBS reception report) for an MBS group and/or for an indicated UE 502 in the MBS group for the MBS service. The latter case be used for some app user subscriber which subscribes premium services for guarantee QoS.

In one embodiment, the MBS AS 628 requests the results of the MBS reception report from the UE 502 in the application layer. If the changes of the allocated MBS group ID is needed for a specific UE due to the resultant MBS reception, the MBS AS 628 can request for provisioning new set of QoS parameters for the specific UE or reallocates a new MBS group ID to the UE 502.

In another embodiment, the UE configuration procedure is used. This embodiment may operate as follows:

Operation 1: the MBS AS 628 requests a UE 502 to report the results of the MBS reception report from the PCF 626 directly or via NEF 623.

Operation 2: the PCF 626 initiates the UE configuration Update procedure which includes MBS reception reporting policy which is used by the UE to report its results of the reception of the MBS session. The reporting policy includes the schedule for reporting the allocated MBS session.

Operation 3: The UE 502 reports its MBS QoS status in Uplink NAS-transport message for reporting received QoS of the MBS service based on the reporting policies.

Operation 4: the PCF 626 forwards the MBS QoS status to the SMF 624 for the UE 502.

Operation 5: the SMF 624 can perform the following procedure to reflect the required changes in UPF/RAN node 508.

Operation 6: the PCF 626 reports the QoS monitoring results to the AF 628 directly or via NEF 623 if the configured reporting criteria is met.

[AF 628]: If the changes of the allocated MBS group ID is needed for a specific UE 502 due to the resultant MBS reception, the MBS AS 628 can request for provisioning new set of QoS parameters for the specific UE 502 or reallocates a new MBS group ID to the UE 502.

In another embodiment, the reporting is based on MSB measurement report: UE 502→RAN 504→SMF 624.

In this embodiment, when receiving MBS AS 628 request for MBS QoS monitoring (or MBS reception report), the PCF 626 sends the request to SMF 624 for configuring QoS monitoring to the impacted RAN nodes 508.

For the RAN node 508, the RAN node 508 schedules MBS measurement report for a group of UEs.

[RAN 504]: The measurement results collected from the UEs can be used by the RAN node 508 to manage MBS radio resources.

[RAN 504→SMF 624]: Further, the RAN node 508 can determine and provide a MBS status report, based on the aggregated measurement reports, to PCF 626 in response to the request for MBS QoS monitoring (or MBS reception report).

[SMF 624→UPF 602]: The SMF 624 collects the MBS QoS report and determines if adding a PSA is needed to improve the QoS for a QoS flow of the MBS session.

[SMF 624→AF 628 via PCF 626]: the SMF 624 reports the QoS monitoring results to PCF 626. The results are further provided to the AF 628 directly or via NEF 623 if the configured reporting criteria is met.

[AF 628]: If the changes of the allocated MBS group ID is needed for a specific UE 502 due to the resultant MBS reception, the MBS AS 628 can request for provisioning new set of QoS parameters for the specific UE 502 or reallocates a new MBS group ID to the UE 502.

3. Example Systems and Device Configurations and Arrangements

Referring now to FIG. 5, which illustrates a network 500 in accordance with various embodiments. The network 500 may operate in a manner consistent with 3GPP technical specifications for Long Term Evolution (LTE) or 5G/NR systems. However, the example embodiments are not limited in this regard and the described embodiments may apply to other networks that benefit from the principles described herein, such as future 3GPP systems, or the like.

The network 500 includes a UE 502, which is any mobile or non-mobile computing device designed to communicate with a RAN 504 via an over-the-air connection. The UE 502 is communicatively coupled with the RAN 504 by a Uu interface, which may be applicable to both LTE and NR systems. Examples of the UE 502 include, but are not limited to, a smartphone, tablet computer, wearable computer, desktop computer, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, machine-to-machine (M2M), device-to-device (D2D), machine-type communication (MTC) device, Internet of Things (IoT) device, and/or the like. The network 500 may include a plurality of UEs 502 coupled directly with one another via a D2D, ProSe, PC5, and/or sidelink (SL) interface. These UEs 502 may be M2M/D2D/MTC/IoT devices and/or vehicular systems that communicate using physical SL channels such as, but not limited to, Physical Sidelink Broadcast Channel (PSBCH), Physical Sidelink Discovery Channel (PSDCH), Physical Sidelink Shared Channel (PSSCH), Physical Sidelink Control Channel (PSCCH), Physical Sidelink Feedback Channel (PSFCH), etc.

In some embodiments, the UE 502 may additionally communicate with an AP 506 via an over-the-air (OTA) connection. The AP 506 manages a WLAN connection, which may serve to offload some/all network traffic from the RAN 504. The connection between the UE 502 and the AP 506 may be consistent with any IEEE 802.11 protocol. Additionally, the UE 502, RAN 504, and AP 506 may utilize cellular-WLAN aggregation/integration (e.g., LWA/LWIP). Cellular-WLAN aggregation may involve the UE 502 being configured by the RAN 504 to utilize both cellular radio resources and WLAN resources.

The UE 502 may be configured to perform signal and/or cell measurements based on a configuration obtain from the network (e.g., RAN 504). The UE 502 derives cell measurement results by measuring one or multiple beams per cell as configured by the network. For all cell measurement results, the UE 502 applies layer 3 (L3) filtering before using the measured results for evaluation of reporting criteria and measurement reporting. For cell measurements, the network can configure Reference Signal Received Power (RSRP), Reference Signal Received Quality (RSRQ), and/or Signal-to-Interference plus Noise Ratio (SINR) as a trigger quantity. Reporting quantities can be the same as the trigger quantity or combinations of quantities (e.g., RSRP and RSRQ; RSRP and SINR; RSRQ and SINR; RSRP, RSRQ and SINR). In other embodiments, other measurements and/or combinations of measurements may be used as a trigger quantity such as those discussed in 3GPP TS 36.214 v15.3.0 (2018 Sep. 27) (hereinafter "[TS36214]"), 3GPP TS 38.215 v15.5.0 (2019 Jun. 24) (hereinafter "[TS38215]"), Institute of Electrical and Electronics Engineers (IEEE) Standards Association, "IEEE Computer Society: "Part 11: Wireless LAN Medium Access Control (MAC) and Physical Layer (PHY) Specifications", IEEE Std 802.11™-2012 (2012) (hereinafter "[IEEE80211]"), and/or the like.

The RAN 504 includes one or more access network nodes (ANs) 508. The ANs 508 terminate air-interface(s) for the UE 502 by providing access stratum protocols including Radio Resource Control (RRC), Packet Data Convergence Protocol (PDCP), Radio Link Control (RLC), Medium Access Control (MAC), and physical (PHY/L1) layer protocols. In this manner, the AN 508 enables data/voice connectivity between CN 520 and the UE 502. The UE 502 and can be configured to communicate using OFDM communication signals with other UEs 502 or with any of the AN 508 over a multicarrier communication channel in accordance with various communication techniques, such as, but not limited to, an OFDMA communication technique (e.g., for DL communications) or a SC-FDMA communication technique (e.g., for UL and SL communications), although the scope of the embodiments is not limited in this respect. The OFDM signals comprise a plurality of orthogonal subcarriers.

The ANs 508 may be a macrocell base station or a low power base station for providing femtocells, picocells or other like cells having smaller coverage areas, smaller user capacity, or higher bandwidth compared to macrocells; or some combination thereof. In these implementations, an 508 be referred to as a BS, gNB, RAN node, eNB, ng-eNB, NodeB, RSU, TRxP, etc.

One example implementation is a "CU/DU split" architecture where the ANs 508 are embodied as a gNB-Central Unit (CU) that is communicatively coupled with one or more gNB-Distributed Units (DUs), where each DU may be communicatively coupled with one or more Radio Units (RUs) (also referred to as RRHs, RRUs, or the like) (see e.g., 3GPP TS 38.401 v15.7.0 (2020 Jan. 9)). In some implementations, the one or more RUs may be individual RSUs. In some implementations, the CU/DU split may include an ng-eNB-CU and one or more ng-eNB-DUs instead of, or in addition to, the gNB-CU and gNB-DUs, respectively. The ANs 508 employed as the CU may be implemented in a discrete device or as one or more software entities running on server computers as part of, for example, a virtual network including a virtual Base Band Unit (BBU) or BBU pool, cloud RAN (CRAN), Radio Equipment Controller (REC), Radio Cloud Center (RCC), centralized RAN (C-RAN), virtualized RAN (vRAN), and/or the like (although these terms may refer to different implementation concepts). Any other type of architectures, arrangements, and/or configurations can be used.

The plurality of ANs may be coupled with one another via an X2 interface (if the RAN 504 is an LTE RAN or Evolved Universal Terrestrial Radio Access Network (E-UTRAN) 510) or an Xn interface (if the RAN 504 is a NG-RAN 514). The X2/Xn interfaces, which may be separated into control/user plane interfaces in some embodiments, may allow the ANs to communicate information related to handovers, data/context transfers, mobility, load management, interference coordination, etc.

The ANs of the RAN 504 may each manage one or more cells, cell groups, component carriers, etc. to provide the UE 502 with an air interface for network access. The UE 502 may be simultaneously connected with a plurality of cells provided by the same or different ANs 508 of the RAN 504. For example, the UE 502 and RAN 504 may use carrier aggregation (CA) to allow the UE 502 to connect with a plurality of component carriers, each corresponding to a PCell or SCell. A PCell is an MCG cell, operating on a primary frequency, in which the UE 502 performs an initial connection establishment procedure and/or initiates a connection re-establishment procedure. An SCell is a cell providing additional radio resources on top of a Special Cell (SpCell) when the UE 502 is configured with CA. In CA, two or more Component Carriers (CCs) are aggregated. The UE 502 may simultaneously receive or transmit on one or multiple CCs depending on its capabilities. A UE 502 with single timing advance capability for CA can simultaneously receive and/or transmit on multiple CCs corresponding to multiple serving cells sharing the same timing advance (multiple serving cells grouped in one timing advance group (TAG)). A UE 502 with multiple timing advance capability for CA can simultaneously receive and/or transmit on multiple CCs corresponding to multiple serving cells with different timing advances (multiple serving cells grouped in multiple TAGs). The NG-RAN 514 ensures that each TAG contains at least one serving cell; A non-CA capable UE 502 can receive on a single CC and transmit on a single CC corresponding to one serving cell only (one serving cell in one TAG). CA is supported for both contiguous and non-contiguous CCs. When CA is deployed frame timing and SFN are aligned across cells that can be aggregated, or an offset in multiples of slots between the PCell/PSCell and an SCell is configured to the UE 502. In some implementations, the maximum number of configured CCs for a UE 502 is 16 for DL and 16 for UL.

In Dual Connectivity (DC) scenarios, a first AN 508 may be a master node that provides a Master Cell Group (MCG) and a second AN 508 may be secondary node that provides an Secondary Cell Group (SCG). The first and second ANs 508 may be any combination of eNB, gNB, ng-eNB, etc. The MCG is a subset of serving cells comprising the PCell and zero or more SCells. The SCG is a subset of serving cells comprising the PSCell and zero or more SCells. As alluded to previously, DC operation involves the use of PSCells and SpCells. A PSCell is an SCG cell in which the UE 502 performs random access (RA) when performing a reconfiguration with Sync procedure, and an SpCell for DC operation is a PCell of the MCG or the PSCell of the SCG; otherwise the term SpCell refers to the PCell. Additionally, the PCell, PSCells, SpCells, and the SCells can operate in the same frequency range (e.g., FR1 or FR2), or the PCell, PSCells, SpCells, and the SCells can operate in different frequency ranges. In one example, the PCell may operate in a sub-6 GHz frequency range/band and the SCell can operate at frequencies above 24.25 GHz (e.g., FR2).

The RAN 504 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In some embodiments, the RAN 504 may be an E-UTRAN 510 with one or more eNBs 512. The E-UTRAN 510 provides an LTE air interface (Uu) with the following characteristics: subcarrier spacing (SCS) of 15 kHz; cyclic prefix (CP)-OFDM waveform for DL and SC-FDMA waveform for UL; turbo codes for data and TBCC for control; etc. The LTE air interface may rely on channel state information reference signals (CSI-RS) for channel state information (CSI) acquisition and beam management; Physical Downlink Shared Channel (PDSCH)/Physical Downlink Control Channel (PDCCH) Demodulation Reference Signal (DMRS) for PDSCH/PDCCH demodulation; and cell-specific reference signals (CRS) for cell search and initial acquisition, channel quality measurements, and channel estimation for coherent demodulation/detection at the UE. The LTE air interface may operating on sub-6 GHz bands.

In some embodiments, the RAN 504 may be an next generation (NG)-RAN 514 with one or more gNB 516 and/or on or more ng-eNB 518. The gNB 516 connects with 5G-enabled UEs 502 using a 5G NR interface. The gNB 516 connects with a 5GC 540 through an NG interface, which includes an N2 interface or an N3 interface. The ng-eNB 518 also connects with the 5GC 540 through an NG interface, but may connect with a UE 502 via the Uu interface. The gNB 516 and the ng-eNB 518 may connect with each other over an Xn interface.

In some embodiments, the NG interface may be split into two parts, an NG user plane (NG-U) interface, which carries traffic data between the nodes of the NG-RAN 514 and a UPF (e.g., N3 interface), and an NG control plane (NG-C) interface, which is a signaling interface between the nodes of the NG-RAN 514 and an AMF 621 (e.g., N2 interface).

The NG-RAN 514 may provide a 5G-NR air interface (which may also be referred to as a Uu interface) with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use Physical Broadcast Channel (PBCH) DMRS for PBCH demodulation; Phase Tracking Reference Signals (PTRS) for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an Synchronization Signal Block (SSB) that is an area of a DL resource grid that includes Primary Synchronization Signal (PSS)/Secondary Synchronization Signal (SSS)/PBCH.

The 5G-NR air interface may utilize bandwidth parts (BWPs) for various purposes. For example, BWP can be used for dynamic adaptation of the SCS. A BWP is a subset of contiguous common resource blocks defined in clause 4.4.4.3 of 3GPP TS 38.211 or a given numerology in a BWP on a given carrier. For example, the UE 502 can be configured with multiple BWPs where each BWP configuration has a different SCS. When a BWP change is indicated to the UE 502, the SCS of the transmission is changed as well. Another use case example of BWP is related to power saving. In particular, multiple BWPs can be configured for the UE 502 with different amount of frequency resources (e.g., PRBs) to support data transmission under different traffic loading scenarios. A BWP containing a smaller number of PRBs can be used for data transmission with small traffic load while allowing power saving at the UE 502 and in some cases at the gNB 516. A BWP containing a larger number of PRBs can be used for scenarios with higher traffic load.

The RAN 504 is communicatively coupled to CN 520, which includes network elements and/or network functions (NFs) to provide various functions to support data and telecommunications services to customers/subscribers (e.g., UE 502). The network elements and/or NFs may be implemented by one or more servers 521, 541. The components of the CN 520 may be implemented in one physical node or separate physical nodes. In some embodiments, NFV may be utilized to virtualize any or all of the functions provided by the network elements of the CN 520 onto physical compute/storage resources in servers, switches, etc. A logical instantiation of the CN 520 may be referred to as a network slice, and a logical instantiation of a portion of the CN 520 may be referred to as a network sub-slice.

The CN 520 may be an LTE CN 522 (also referred to as an Evolved Packet Core (EPC) 522). The EPC 522 may include MME, SGW, SGSN, HSS, PGW, PCRF, and/or other NFs coupled with one another over various interfaces (or "reference points") (not shown). The CN 520 may be a 5GC 540 including an AUSF, AMF, SMF, UPF, NSSF, NEF, NRF, PCF 626, UDM, AF, and/or other NFs coupled with one another over various service-based interfaces and/or reference points (see e.g., FIGS. 6 and 7). The 5GC 540 may enable edge computing by selecting operator/3rd party services to be geographically close to a point that the UE 502 is attached to the network. This may reduce latency and load on the network. In edge computing implementations, the 5GC 540 may select a UPF close to the UE 502 and execute traffic steering from the UPF to DN 536 via the N6 interface. This may be based on the UE subscription data, UE location, and information provided by the AF 628, which allows the AF 628 to influence UPF (re)selection and traffic routing.

The data network (DN) 536 may represent various network operator services, Internet access, or third party services that may be provided by one or more servers including, for example, application (app)/content server 538. The DN 536 may be an operator external public, a private PDN, or an intra-operator packet data network, for example, for provision of IMS services. In this embodiment, the server 538 can be coupled to an IMS via an S-CSCF or the I-CSCF. In some implementations, the DN 536 may represent one or more local area DNs (LADNs), which are DNs 536 (or DN names (DNNs)) that is/are accessible by a UE 502 in one or more specific areas. Outside of these specific areas, the UE 502 is not able to access the LADN/DN 536.

Additionally or alternatively, the DN 536 may be an Edge DN 536, which is a (local) Data Network that supports the architecture for enabling edge applications. In these embodiments, the app server 538 may represent the physical hardware systems/devices providing app server functionality and/or the application software resident in the cloud or at an edge compute node that performs server function(s). In some embodiments, the app/content server 538 provides an edge hosting environment that provides support required for Edge Application Server's execution.

In some embodiments, the 5GS can use one or more edge compute nodes to provide an interface and offload processing of wireless communication traffic. In these embodiments, the edge compute nodes may be included in, or co-located with one or more RAN 510, 514. For example, the edge compute nodes can provide a connection between the RAN 514 and UPF in the 5GC 540. The edge compute nodes can use one or more NFV instances instantiated on virtualization infrastructure within the edge compute nodes to process wireless connections to and from the RAN 514 and a UPF 602.

In some implementations, the system 500 may include an SMSF, which is responsible for SMS subscription checking and verification, and relaying SM messages to/from the UE 502 to/from other entities, such as an SMS-GMSC/IWMSC/SMS-router. The SMS may also interact with AMF and UDM for a notification procedure that the UE 502 is available for SMS transfer (e.g., set a UE not reachable flag, and notifying UDM when UE 502 is available for SMS).

FIGS. 6 and 7 illustrate example system architectures 600 and 700 of a 5GC (collectively "5GC 600") such as CN 540 of FIG. 5, in accordance with various embodiments. FIG. 8 shows a reference point representation of a reference architecture 800 of a policy and charging control framework for the 5GS, which may be part of the 5GC 600. In particular, FIG. 6 shows an exemplary 5G system architecture 600 in a reference point representation where interactions between NFs are represented by corresponding point-to-point reference points Ni, and FIG. 7 illustrates an exemplary 5G system architecture 700 in a service-based representation where interactions between NFs are represented by corresponding service-based interfaces. The system 600 is shown to include a UE 601, which may be the same or similar to the UEs 502 discussed previously; a (R)AN 610, which may be the same or similar to the AN 508 discussed previously; and a DN 603, which may be, for example, operator services, Internet access or 3rd party services, and may correspond with a Packet Data Network in LTE systems; and a 5GC 620. The 5GC 620 may include an Access and Mobility Management Function (AMF) 621; an Authentication Server Function (AUSF) 622; a Session Management Function (SMF) 624; a Network Exposure Function (NEF) 623; a Policy Control Function (PCF) 626; an NF Repository Function (NRF) 625; a Unified Data Management (UDM) 627; an Application Function (AF) 628; a User Plane Function (UPF) 602; a Network Slice Selection Function (NSSF) 629; a Service Communication Proxy (SCP) 630; a Network Slice Specific Authentication and Authorization Function (NSSAAF) 631; a Network Data Analytics Function (NWDAF) 722; a Charging Function (CHF) 723; and a Unified Data Repository (UDR) 727.

The reference point representation of FIGS. 6 and 8 shows various interactions between corresponding NFs. FIG. 6 illustrates the following reference points: N1 (between the UE 601 and the AMF 621), N2 (between the RAN 610 and the AMF 621), N3 (between the RAN 610 and the UPF 602), N4 (between the SMF 624 and the UPF 602), N5 (between the PCF 626 and the AF 628), N6 (between the UPF 602 and the DN 603), N7 (between the SMF 624 and the PCF 626), N8 (between the UDM 627 and the AMF 621), N9 (between two UPFs 602), N10 (between the UDM 627 and the SMF 624), N11 (between the AMF 621 and the SMF 624), N12 (between the AUSF 622 and the AMF 621), N13 (between the AUSF 622 and the UDM 627), N14 (between two AMFs 621), N15 (between the PCF 626 and the AMF 621 in case of a non-roaming scenario, or between the PCF 626 and a visited network and AMF 621 in case of a roaming scenario), N16 (between two SMFs; not shown), and N22 (between AMF 621 and NSSF 625). Other reference point representations not shown in FIG. 6 can also be used (see e.g., [TS23501], clause 4.2.7).

The reference point representation of reference architecture 800 illustrates the following reference points: N4, N5, N7, and N15 as shown by FIG. 6 as well as N23 (between the PCF 626 and the NWDAF 722), N28 (between the PCF 626 and the CHF 723), N29 (between the SMF 624 and the NEF 623), N30 (between the PCF 626 and the NEF 623), N36 (between the PCF 626 and the UDR 727), and N40 (between the SMF 624 and the CHF 723).

The service-based representation of FIG. 7 represents NFs within the control plane that enable other authorized NFs to access their services. In this regard, 5G system architecture 300 can include the following service-based interfaces: Namf (a service-based interface exhibited by the AMF 621), Nsmf (a service-based interface exhibited by the SMF 624), Nnef (a service-based interface exhibited by the NEF 623), Npcf (a service-based interface exhibited by the PCF 626), Nudm (a service-based interface exhibited by the UDM 627), Naf (a service-based interface exhibited by the AF 628), Nnrf (a service-based interface exhibited by the NRF 625), Nnssf (a service-based interface exhibited by the NSSF 629), Nausf (a service-based interface exhibited by the AUSF 622), Nnssaaf (a service-based interface exhibited by NSSAAF), Nnwdaf (a service-based interface exhibited by NWDAF 722), Nchf (a service-based interface exhibited by CHF 723; see e.g., [TS32240]), and Nudr (a service-based interface exhibited by UDR 727).

Other service-based interfaces (e.g., Nudr, N5g-eir, and Nudsf) not shown in FIG. 7 can also be used. In embodiments, the NEF 623 can provide an interface to Edge node 636, which can be used to process wireless connections with the RAN 610.

The 5GS 600 is assumed to operate with a large number of UEs 601 used for CIoT and capable of appropriately handling overload and congestion situations. UEs 601 used for CIoT can be mobile or nomadic/static, and resource efficiency should be considered for both for relevant optimization(s). The 5GS 600 also supports one or more small data delivery mechanisms using IP data and Unstructured (Non-IP) data.

The AUSF 622 stores data for authentication of UE 601 and handle authentication-related functionality. The AUSF 622 may facilitate a common authentication framework for various access types. The AUSF 622 may communicate with the AMF 621 via an N12 reference point between the AMF 621 and the AUSF 622; and may communicate with the UDM 627 via an N13 reference point between the UDM 627 and the AUSF 622. Additionally, the AUSF 622 may exhibit an Nausf service-based interface.

The AMF 621 allows other functions of the 5GC 600 to communicate with the UE 601 and the RAN 610 and to subscribe to notifications about mobility events with respect to the UE 601. The AMF 621 is also responsible for registration management (e.g., for registering UE 601), connection management, reachability management, mobility management, lawful interception of AMF-related events, and access authentication and authorization. The AMF 621 provides transport for SM messages between the UE 601 and the SMF 624, and acts as a transparent proxy for routing SM messages. AMF 621 also provides transport for SMS messages between UE 601 and an SMSF. AMF 544 interacts with the AUSF 622 and the UE 601 to perform various security anchor and context management functions. Furthermore, AMF 621 is a termination point of a RAN-CP interface, which includes the N2 reference point between the RAN 610 and the AMF 621. The AMF 621 is also a termination point of Non-Access Stratum (NAS) (N1) signaling, and performs NAS ciphering and integrity protection.

The AMF 621 also supports NAS signaling with the UE 601 over an N3IWF interface. The N3IWF provides access to untrusted entities. N3IWF may be a termination point for the N2 interface between the (R)AN 610 and the AMF 621 for the control plane, and may be a termination point for the N3 reference point between the (R)AN 610 and the UPF 602 for the user plane. As such, the AMF 621 handles N2 signalling from the SMF 624 and the AMF 621 for PDU sessions and QoS, encapsulate/de-encapsulate packets for IPSec and N3 tunneling, marks N3 user-plane packets in the uplink, and enforces QoS corresponding to N3 packet marking taking into account QoS requirements associated with such marking received over N2. N3IWF may also relay UL and DL control-plane NAS signalling between the UE 601 and AMF 621 via an N1 reference point between the UE 601 and the AMF 621, and relay uplink and downlink user-plane packets between the UE 601 and UPF 602. The N3IWF also provides mechanisms for IPsec tunnel establishment with the UE 601. The AMF 621 may exhibit an Namf service-based interface, and may be a termination point for an N14 reference point between two AMFs 640 and an N17 reference point between the AMF 621 and a 5G-EIR (not shown by FIG. 5).

The SMF 624 is responsible for SM (e.g., session establishment, tunnel management between UPF 602 and (R)AN 610); UE IP address allocation and management (including optional authorization); selection and control of UP function; configuring traffic steering at UPF 602 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 621 over N2 to (R)AN 610; and determining SSC mode of a session. SM refers to management of a PDU session, and a PDU session or "session" refers to a PDU connectivity service that provides or enables the exchange of PDUs between the UE 601 and the DN 603. The SMF 624 also support interfaces towards CHF 723 and PCF 626. The SMF 624 interacts with the CHF 723 and the PCF 626 based on information received from other control plane NFs and user plane related information received from the UPF 602.

The UPF 602 acts as an anchor point for intra-RAT and inter-RAT mobility, an external PDU session point of interconnect to data network 603, and a branching point to support multi-homed PDU session. The UPF 602 also performs packet routing and forwarding, packet inspection, enforces user plane part of policy rules, lawfully intercept packets (UP collection), performs traffic usage reporting, perform QoS handling for a user plane (e.g., packet filtering, gating, UL/DL rate enforcement), performs uplink traffic verification (e.g., SDF-to-QoS flow mapping), transport level packet marking in the uplink and downlink, and performs downlink packet buffering and downlink data notification triggering. UPF 602 may include an uplink classifier to support routing traffic flows to a data network.

The NSSF 629 selects a set of network slice instances serving the UE 601. The NSSF 629 also determines allowed NSSAI and the mapping to the subscribed S-NSSAIs, if needed. The NSSF 629 also determines an AMF set to be used to serve the UE 601, or a list of candidate AMFs 621 based on a suitable configuration and possibly by querying the NRF 625. The selection of a set of network slice instances for the UE 601 may be triggered by the AMF 621 with which the UE 601 is registered by interacting with the NSSF 629; this may lead to a change of AMF 621. The NSSF 629 interacts with the AMF 621 via an N22 reference point; and may communicate with another NSSF in a visited network via an N31 reference point (not shown).

The NEF 623 securely exposes services and capabilities provided by 3GPP NFs for third party, internal exposure/re-exposure, AFs 628, edge computing or fog computing systems (e.g., edge compute node 636, etc. In such embodiments, the NEF 623 may authenticate, authorize, or throttle the AFs 628. NEF 623 may also translate information exchanged with the AF 628 and information exchanged with internal network functions. For example, the NEF 623 may translate between an AF-Service-Identifier and an internal 5GC information. NEF 623 may also receive information from other NFs based on exposed capabilities of other NFs. This information may be stored at the NEF 623 as structured data, or at a data storage NF using standardized interfaces. The stored information can then be re-exposed by the NEF 623 to other NFs and AFs 628, or used for other purposes such as analytics. External exposure of network capabilities towards Services Capabilities Server (SCS)/app server 640 or AF 628 is supported via the NEF 623. Notifications and data from NFs in the Visiting Public Land Mobile Network (VPLMN) to the NEF 623 can be routed through an inter-working (IWK)-NEF (not shown), similar to the IWK-Service Capability Exposure Function (SCEF) in an EPC (not shown).

The NRF 625 supports service discovery functions, receives NF discovery requests from NF instances, and provides information of the discovered NF instances to the requesting NF instances. NRF 625 also maintains information of available NF instances and their supported services. The NRF 625 also supports service discovery functions, wherein the NRF 625 receives NF Discovery Request from NF instance or an SCP 630, and provides information of the discovered NF instances to the NF instance or SCP 630.

The PCF 626 provides policy rules to control plane functions to enforce them, and may also support unified policy framework to govern network behavior. The PCF 626 may also implement a front end to access subscription information relevant for policy decisions in a UDR 727 of the UDM 627. In addition to communicating with functions over reference points as shown, the PCF 626 exhibit an Npcf service-based interface.

The UDM 627 handles subscription-related information to support the network entities' handling of communication sessions, and stores subscription data of UE 601. For example, subscription data may be communicated via an N8 reference point between the UDM 627 and the AMF 621. The UDM 627 may include two parts, an application front end and a UDR 727. The UDR 727 stores subscription data and policy data for the UDM 627 and the PCF 626, and/or structured data for exposure and application data (including PFDs for application detection, application request information for multiple UEs 601) for the NEF 623. The Nudr service-based interface may be exhibited by the UDR 727 to allow the UDM 627, PCF 626, and NEF 623 to access a particular set of the stored data, as well as to read, update (e.g., add, modify), delete, and subscribe to notification of relevant data changes in the UDR 727. The UDM 627 may include a UDM-FE, which is in charge of processing credentials, location management, subscription management and so on. Several different front ends may serve the same user in different transactions. The UDM-FE accesses subscription information stored in the UDR 727 and performs authentication credential processing, user identification handling, access authorization, registration/mobility management, and subscription management. In addition to communicating with other NFs over reference points as shown, the UDM 627 may exhibit the Nudm service-based interface.

The AF 628 provides application influence on traffic routing, provide access to NEF 623, and interact with the policy framework for policy control. The AF 628 may influence UPF 602 (re)selection and traffic routing. Based on operator deployment, when AF 628 is considered to be a trusted entity, the network operator may permit AF 628 to interact directly with relevant NFs.

Additionally, the AF 628 may be used for edge computing implementations. The 5GC 600 may enable edge computing by selecting operator/3rd party services to be geographically close to a point that the UE 601 is attached to the network. This may reduce latency and load on the network. In edge computing implementations, the 5GC 600 may select a UPF 602 close to the UE 502 and execute traffic steering from the UPF 602 to DN 603 via the N6 interface. This may be based on the UE subscription data, UE location, and information provided by the AF 628, which allows the AF 628 to influence UPF (re)selection and traffic routing.

The DN 603 may represent various network operator services, Internet access, or third party services that may be provided by one or more servers including, for example, application (app)/content server 640. The DN 603 may be an operator external public, a private PDN, or an intra-operator packet data network, for example, for provision of IMS services. In this embodiment, the app server 640 can be coupled to an IMS via an S-CSCF or the I-CSCF. In some implementations, the DN 603 may represent one or more local area DNs (LADNs), which are DNs 603 (or DN names (DNNs)) that is/are accessible by a UE 601 in one or more specific areas. Outside of these specific areas, the UE 601 is not able to access the LADN/DN 603.

In some implementations, the application programming interfaces (APIs) for CIoT related services provided to the SCS/app server 640 is/are common for UEs 601 connected to an EPS and 5GS 600 and accessed via an Home Public Land Mobile Network (HPLMN). The level of support of the APIs may differ between EPS and 5GS. CIoT UEs 601 can simultaneously connect to one or multiple SCSs/app servers 640 and/or Afs 628.

In some implementations, the DN 603 may be, or include, one or more edge compute nodes 636. Additionally or alternatively, the DN 603 may be an Edge DN 603, which is a (local) Data Network that supports the architecture for enabling edge applications. In these embodiments, the app server 640 may represent the physical hardware systems/devices providing app server functionality and/or the application software resident in the cloud or at an edge compute node 636 that performs server function(s). In some embodiments, the app/content server 640 provides an edge hosting environment that provides support required for Edge Application Server's execution.

In some embodiments, the 5GS can use one or more edge compute nodes 636 to provide an interface and offload processing of wireless communication traffic. In these embodiments, the edge compute nodes 636 may be included in, or co-located with one or more RANs 610. For example, the edge compute nodes 636 can provide a connection between the RAN 610 and UPF 602 in the 5GC 600. The edge compute nodes 636 can use one or more NFV instances instantiated on virtualization infrastructure within the edge compute nodes 636 to process wireless connections to and from the RAN 610 and UPF 602.

In embodiments, the edge node 636 may include or be part of an edge system (or edge network). The edge node 636 may also be referred to as "edge hosts 636" or "edge servers 636." The edge system includes a collection of edge servers 636 and edge management systems (not shown) necessary to run edge computing applications within an operator network or a subset of an operator network. The edge servers 636 are physical computer systems that may include an edge platform and/or virtualization infrastructure, and provide compute, storage, and network resources to edge computing applications. Each of the edge servers 636 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 501, 601 The VI of the edge servers 636 provide virtualized environments and virtualized resources for the edge hosts, and the edge computing applications may run as VMs and/or application containers on top of the VI. Various edge computing/networking technologies in various combinations and layouts of devices located at the edge of a network may be used. Examples of such edge computing/networking technologies that may implement the embodiments herein include ETSI MEC; CDNs Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

The SCP 630 (or individual instances of the SCP 630) supports indirect communication (see e.g., [TS23501], section 7.1.1); delegated discovery (see e.g., [TS23501] section 7.1.1); message forwarding and routing to destination NF/NF service(s), communication security (e.g., authorization of the NF Service Consumer to access the NF Service Producer API), load balancing, monitoring, overload control, etc.; and discovery and selection functionality for UDM(s) 627, AUSF(s) 622, UDR(s) 727, PCF(s) 626 with access to subscription data stored in the UDR based on UE's 502 SUPI, SUCI, or GPSI (see e.g., [TS23501] section 6.3). Load balancing, monitoring, overload control functionality provided by the SCP may be implementation specific. The SCP 230 may be deployed in a distributed manner. More than one SCP 630 can be present in the communication path between various NF Services. The SCP 630, although not an NF instance, can also be deployed distributed, redundant, and scalable. An SCP Domain is a configured group of one or more SCP(s) 630 and zero or more NF instances(s). An SCP 630 within the group can communicate with any NF instance or SCP 630 within the same group directly (e.g., without passing through an intermediate SCP 630).

The NSSAAF 631 supports Network Slice-Specific Authentication and Authorization as specified in [TS23502] with a AAA Server (AAA-S). If the AAA-S belongs to a third party, the NSSAAF may contact the AAA-S via an a AAA proxy (AAA-P).

The NWDAF 722 is part of the architecture specified in [TS23501] and uses the mechanisms and interfaces specified for 5GC in [TS23501] and OAM services (see e.g., 3GPP TS 23.558 v1.0.0 (2020 Sep. 13) ("[TS23558]"), clause 6.2.3.1). The NWDAF 722 represents operator managed network analytics logical function. The NWDAF 722 includes the following functionality: support data collection from NFs and AFs 628; support data collection from OAM; the NWDAF 722 service registration and metadata exposure to NFs/Afs 628; and support analytics information provisioning to NFs, AF 628.

The NWDAF 722 interacts with different entities for different purposes including: data collection based on subscription to events provided by AMF 621, SMF 624, PCF 626, UDM 627, AF 628 (directly or via NEF 622), and OAM; retrieval of information from data repositories (e.g. UDR 727 via UDM 627 for subscriber-related information); retrieval of information about NFs (e.g. from NRF for NF-related information); and on demand provision of analytics to consumers, as specified in clause 6 of [TS23558].

A single instance or multiple instances of NWDAF 722 may be deployed in a PLMN. If multiple NWDAF 722 instances are deployed, the architecture supports deploying the NWDAF 722 as a central NF, as a collection of distributed NFs, or as a combination of both. Multiple instances of NWDAF 722 may be deployed in a network. The NF consumers utilizes the NRF 625 to discover NWDAF 722 instance(s) unless NWDAF 722 information is available by other means, e.g. locally configured on NF consumers. The NWDAF 722 selection function in NF consumers selects an NWDAF 722 instance based on the available NWDAF 722 instances. The following factors may be considered by the NF consumer for NWDAF 722 selection: S-NSSAI; analytics ID(s); and/or NWDAF 722 Serving Area information (e.g., list of TAIs for which the NWDAF 722 can provide analytics). When multiple NWDAF 722 s exist, not all of them need to be able to provide the same type of analytics results, i.e., some of them can be specialized in providing certain types of analytics. An Analytics ID information element is used to identify the type of supported analytics that NWDAF 722 can generate. In some implementations, NWDAF 722 instance(s) can be collocated with a 5GS NF.

The 5GS architecture allows the NWDAF 722 to collect data from any 5GC NF as discussed in clause 6.2.2 of [TS23558]. The NWDAF 722 may or may not belong to the same PLMN as the 5GC NF that provides the data. The Nnf interface is defined for the NWDAF 722 to request subscription to data delivery for a particular context, to cancel subscription to data delivery and to request a specific report of data for a particular context. The 5G System architecture allows NWDAF 722 to retrieve the management data from OAM by invoking OAM services as discussed in clause 6.2.3 of [TS23558]. The 5GS architecture also allows any 5GC NF to request network analytics information from NWDAF 722. The NWDAF 722 belongs to the same PLMN as the 5GC NF that consumes the analytics information. The N NWDAF 722 interface is defined for 5GC NFs, to request subscription to network analytics delivery for a particular context, to cancel subscription to network analytics delivery and to request a specific report of network analytics for a particular context. Various N NWDAF 722 services are discussed in clause 7 of [TS23558].

The CHF 723 is used for collection and reporting of charging information for network resource usage. The SMF 624 supports the interactions towards the charging system, as defined in [TS32240]. The UPF 602 supports functionality to collect and report usage data to SMF 624. The N4 reference point supports the SMF 624 control of the UPF 602 collection and reporting of usage data. The AMF 621 supports interactions towards the charging system, as defined in 3GPP TS 32.256, and the SMSF supports interactions towards the charging system, as defined in 3GPP TS 32.274. The functional description of the CHF 723 is specified in [TS32240], and the CHF discovery and selection function used by the SMF 624 is discussed in clause 6.3.11 of [TS23501].

The system architectures 600, 700, and 800 may also include other elements that are not shown by FIG. 6, 7, or 8, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 2). Individual NFs may share a UDSF for storing their respective unstructured data or individual NFs may each have their own UDSF located at or near the individual NFs. Additionally, the UDSF may exhibit an Nudsf service-based interface (not shown by FIG. 2). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

In another example, the 5G system architecture 600 includes an IP multimedia subsystem (IMS) as well as a plurality of IP multimedia core network subsystem entities, such as call session control functions (CSCFs) (not shown by FIG. 6 or 3). More specifically, the IMS includes a CSCF, which can act as a proxy CSCF (P-CSCF), a serving CSCF (S-CSCF), an emergency CSCF (E-CSCF), or interrogating CSCF (I-CSCF). The P-CSCF can be configured to be the first contact point for the UE 601 within the IMS. The S-CSCF can be configured to handle the session states in the network, and the E-CSCF can be configured to handle certain aspects of emergency sessions such as routing an emergency request to the correct emergency center or public safety answering point (PSAP). The I-CSCF can be configured to function as the contact point within an operator's network for all IMS connections destined to a subscriber of that network operator, or a roaming subscriber currently located within that network operator's service area. In some aspects, the I-CSCF can be connected to another IP multimedia network, for example, an IMS operated by a different network operator.

In some implementations, the 5GS architecture also includes a Security Edge Protection Proxy (SEPP) as an entity sitting at the perimeter of the PLMN for protecting control plane messages. The SEPP enforces inter-PLMN security on the N32 interface. The 5GS architecture may also include an Inter-PLMN UP Security (IPUPS) at the perimeter of the PLMN for protecting user plane messages. The IPUPS is a functionality of the UPF 602 that enforces GTP-U security on the N9 interface between UPFs 602 of the visited and home PLMNs. The IPUPS can be activated with other functionality in a UPF 602 or activated in a UPF 602 that is dedicated to be used for IPUPS functionality (see e.g., [TS23501], clause 5.8.2.14).

Additionally, there may be many more reference points and/or service-based interfaces between the NF services in the NFs; however, these interfaces and reference points have been omitted from FIGS. 6 and 7 for clarity. In one example, the CN 620 may include an Nx interface, which is an inter-CN interface between the MME and the AMF 621 in order to enable interworking between system 700 and an EPC. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 9:
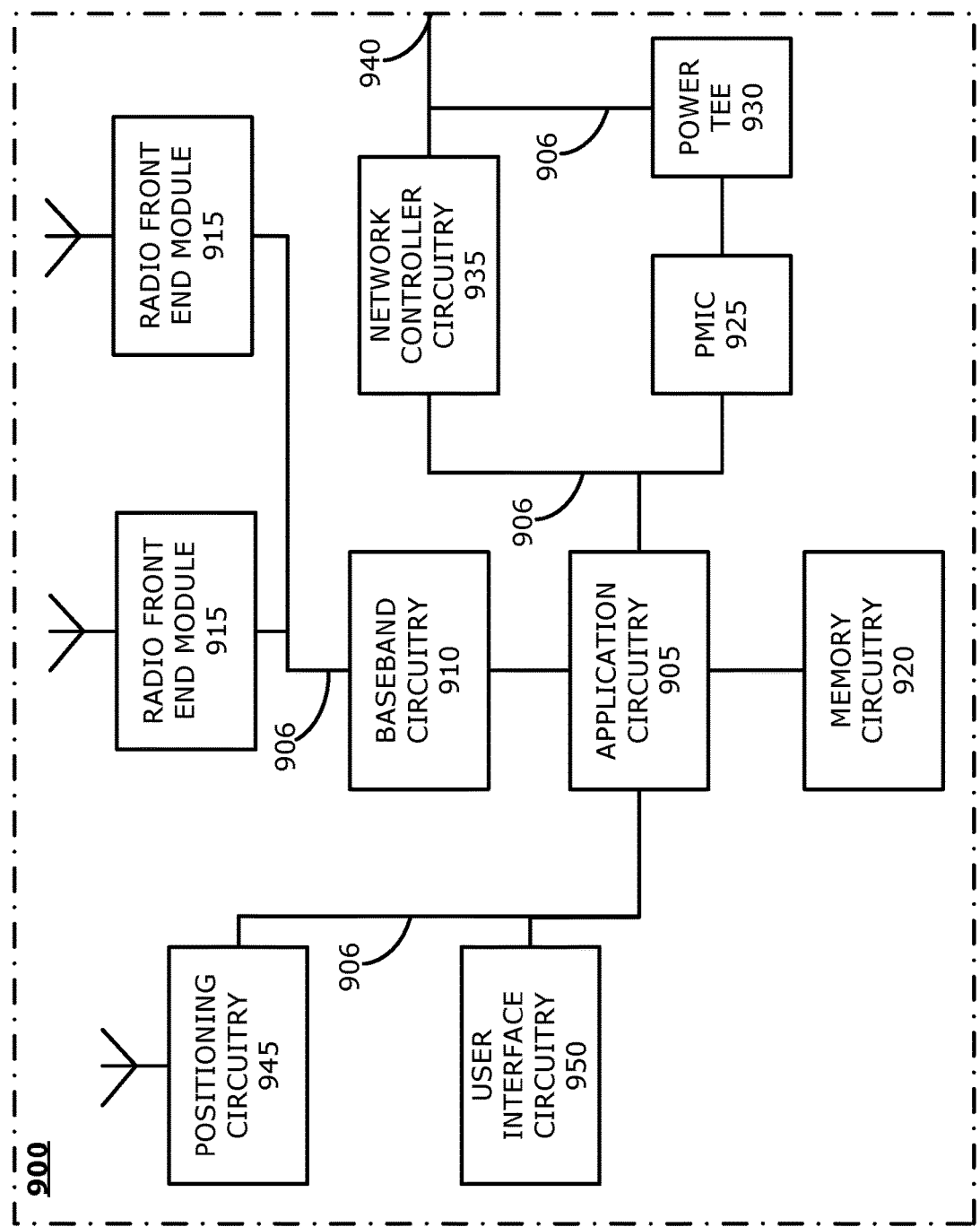
FIG. 9 illustrates an example of infrastructure equipment in accordance with various embodiments.

FIG. 9 illustrates an example of infrastructure equipment 900 in accordance with various embodiments. The infrastructure equipment 900 (or "system 900") may be implemented as a base station, radio head, RAN node such as the AN 508 shown and described previously, app server(s) 538/640, and/or any other element/device discussed herein. In other examples, the system 900 could be implemented in or by a UE 501.

The system 900 includes application circuitry 905, baseband circuitry 910, one or more radio front end modules (RFEMs) 915, memory circuitry 920, power management integrated circuitry (PMIC) 925, power tee circuitry 930, network controller circuitry 935, network interface connector 940, satellite positioning circuitry 945, and user interface 950. In some embodiments, the device 900 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 905 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry x05 may be coupled with or may include memory/storage elements and may be configured to execute instructions stored in the memory/storage to enable various applications or operating systems to run on the system 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 905 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 905 may comprise, or may be, a special-purpose processor/controller to operate according to the various embodiments herein. As examples, the processor(s) of application circuitry 905 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 900 may not utilize application circuitry 905, and instead may include a special-purpose processor/controller to process IP data received from an EPC or 5GC, for example.

In some implementations, the application circuitry 905 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 905 may comprise logic blocks or logic fabric, and other interconnected resources that may be programmed to perform various functions, such as the procedures, methods, functions, etc. of the various embodiments discussed herein. In such embodiments, the circuitry of application circuitry 905 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 910 may be implemented, for example, as a solder-down substrate including one or more integrated circuits, a single packaged integrated circuit soldered to a main circuit board or a multi-chip module containing two or more integrated circuits.

User interface circuitry 950 may include one or more user interfaces designed to enable user interaction with the system 900 or peripheral component interfaces designed to enable peripheral component interaction with the system 900. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 915 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 5111 of FIG. 5 infra), and the RFEM may be connected to multiple antennas. In alternative implementations, both mmWave and sub-mmWave radio functions may be implemented in the same physical RFEM 915, which incorporates both mmWave antennas and sub-mmWave.

The memory circuitry 920 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 920 may be implemented as one or more of solder down packaged integrated circuits, socketed memory modules and plug-in memory cards.

The PMIC 925 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 930 provides for electrical power to be drawn from a network cable to provide both power supply and data connectivity to the infrastructure equipment 900 using a single cable.

The network controller circuitry 935 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 900 via network interface connector 940 using a physical connection, which may be electrical (commonly referred to as a "copper interconnect"), optical, or wireless. The network controller circuitry 935 may include one or more dedicated processors and/or FPGAs to communicate using one or more of the aforementioned protocols. In some implementations, the network controller circuitry 935 may include multiple controllers to provide connectivity to other networks using the same or different protocols.

The positioning circuitry 945 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 945 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 945 may include a Micro-Technology for Positioning, Navigation, and Timing (Micro-PNT) IC that uses a master timing clock to perform position tracking/estimation without GNSS assistance. The positioning circuitry 945 may also be part of, or interact with, the baseband circuitry 910 and/or RFEMs 915 to communicate with the nodes and components of the positioning network. The positioning circuitry 945 may also provide position data and/or time data to the application circuitry 905, which may use the data to synchronize operations with various infrastructure (e.g., AN 508, etc.), or the like.

The components shown by FIG. 9 may communicate with one another using interface circuitry, which may include any number of bus and/or interconnect (IX) technologies such as ISA, extended ISA, I2C, SPI, point-to-point interfaces, power management bus (PMBus), PCI, PCIe, PCIx, Intel® UPI, Intel® IAL, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, and/or any number of other IX technologies. The IX technology may be a proprietary bus, for example, used in an SoC based system.

Figure 10:
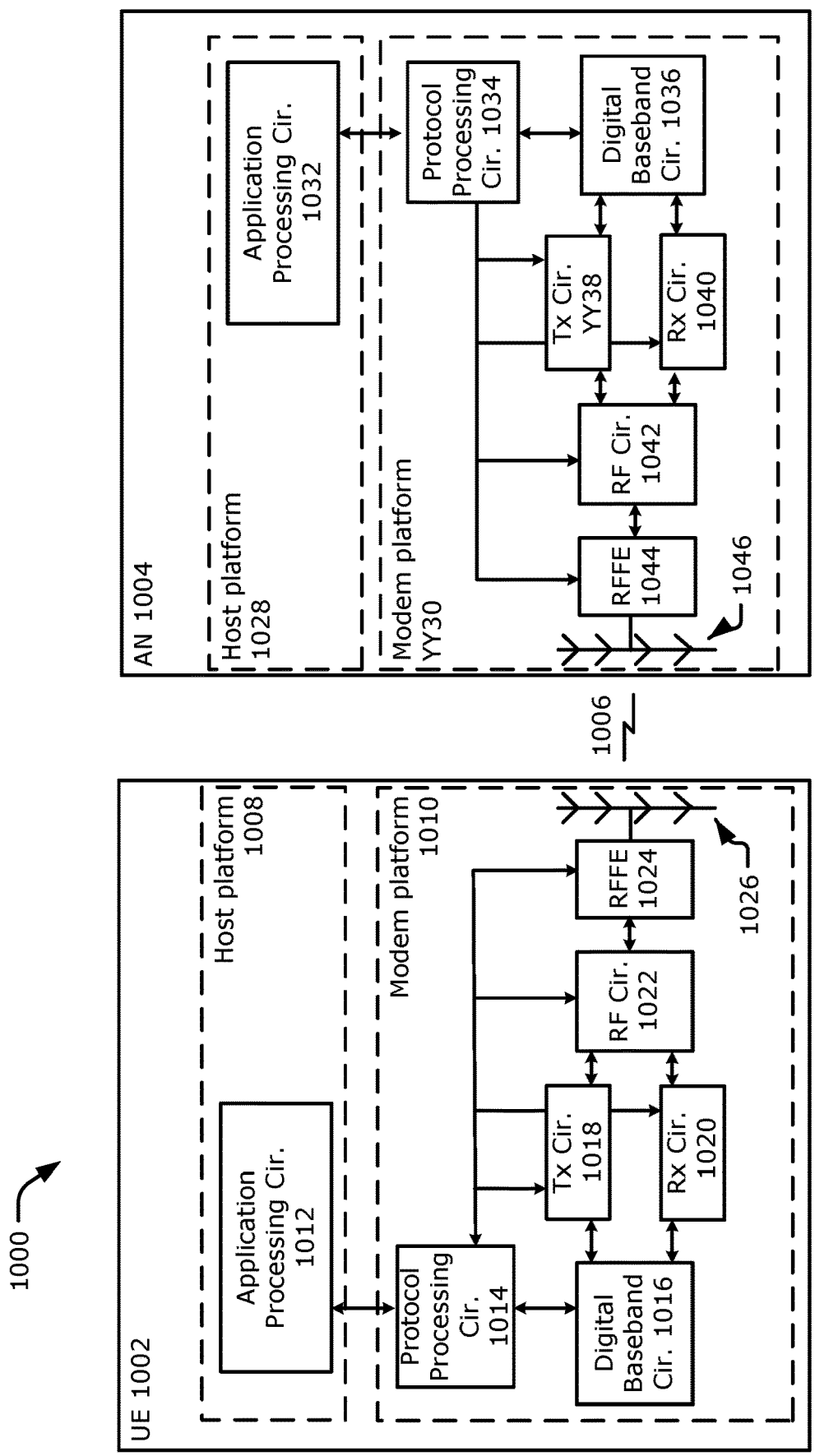
FIG. 10 schematically illustrates a wireless network in accordance with various embodiments.

FIG. 10 schematically illustrates a wireless network 1000 in accordance with various embodiments. The wireless network 1000 includes a UE 1002 in wireless communication with an AN 1004. The UE 1002 and AN 104 may be the same, similar to, and/or substantially interchangeable with, like-named components described elsewhere herein such as the UE 601 and RAN 504 of FIG. 5, and/or system 900 of FIG. 4.

The UE 1002 may be communicatively coupled with the AN 1004 via connection 1006. The connection 1006 is illustrated as an air interface to enable communicative coupling, and can be consistent with cellular communications protocols such as an LTE protocol or a 5G NR protocol operating at mmWave or sub-6 GHz frequencies.

The UE 1002 may include a host platform 1008 coupled with a modem platform 1010. The host platform 1008 may include application processing circuitry 1012, which may be coupled with protocol processing circuitry 1014 of the modem platform 1010. The application processing circuitry 1012 may run various applications for the UE 1002 that source/sink application data. The application processing circuitry 1012 may further implement one or more layer operations to transmit/receive application data to/from a data network. These layer operations may include transport (for example UDP) and Internet (for example, IP) operations The protocol processing circuitry 1014 may implement one or more of layer operations to facilitate transmission or reception of data over the connection 1006. The layer operations implemented by the protocol processing circuitry 1014 may include, for example, MAC, RLC, PDCP, RRC and NAS operations.

The modem platform 1010 may further include digital baseband circuitry 1016 that may implement one or more layer operations that are "below" layer operations performed by the protocol processing circuitry 1014 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1010 may further include transmit circuitry 1018, receive circuitry 1020, RF circuitry 1022, and RF front end (RFFE) 1024, which may include or connect to one or more antenna panels 1026. Briefly, the transmit circuitry 1018 may include a digital-to-analog converter, mixer, intermediate frequency (IF) components, etc.; the receive circuitry 1020 may include an analog-to-digital converter, mixer, IF components, etc.; the RF circuitry 1022 may include a low-noise amplifier, a power amplifier, power tracking components, etc.; RFFE 1024 may include filters (for example, surface/bulk acoustic wave filters), switches, antenna tuners, beamforming components (for example, phase-array antenna components), etc. The selection and arrangement of the components of the transmit circuitry 1018, receive circuitry 1020, RF circuitry 1022, RFFE 1024, and antenna panels 1026 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1014 may include one or more instances of control circuitry (not shown) to provide control functions for the transmit/receive components.

A UE reception may be established by and via the antenna panels 1026, RFFE 1024, RF circuitry 1022, receive circuitry 1020, digital baseband circuitry 1016, and protocol processing circuitry 1014. In some embodiments, the antenna panels 1026 may receive a transmission from the AN 1004 by receive-beamforming signals received by a plurality of antennas/antenna elements of the one or more antenna panels 1026.

A UE transmission may be established by and via the protocol processing circuitry 1014, digital baseband circuitry 1016, transmit circuitry 1018, RF circuitry 1022, RFFE 1024, and antenna panels 1026. In some embodiments, the transmit components of the UE 1004 may apply a spatial filter to the data to be transmitted to form a transmit beam emitted by the antenna elements of the antenna panels 1026.

Similar to the UE 1002, the AN 1004 may include a host platform 1028 coupled with a modem platform 1030. The host platform 1028 may include application processing circuitry 1032 coupled with protocol processing circuitry 1034 of the modem platform 1030. The modem platform may further include digital baseband circuitry 1036, transmit circuitry 1038, receive circuitry 1040, RF circuitry 1042, RFFE circuitry 1044, and antenna panels 1046. The components of the AN 1004 may be similar to and substantially interchangeable with like-named components of the UE 1002. In addition to performing data transmission/reception as described above, the components of the AN 1008 may perform various logical functions that include, for example, RNC functions such as radio bearer management, uplink and downlink dynamic radio resource management, and data packet scheduling.

Although not shown, the components of UE 1002 and/or AN 1004 may communicate with one another using a suitable bus or interconnect (IX) technology, which may include any number of technologies, including ISA, extended ISA, I2C, SPI, point-to-point interfaces, power management bus (PMBus), PCI, PCIe, PCIx, Intel® UPI, Intel® IAL, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX technology may be a proprietary bus, for example, used in an SoC based system.

Figure 11:
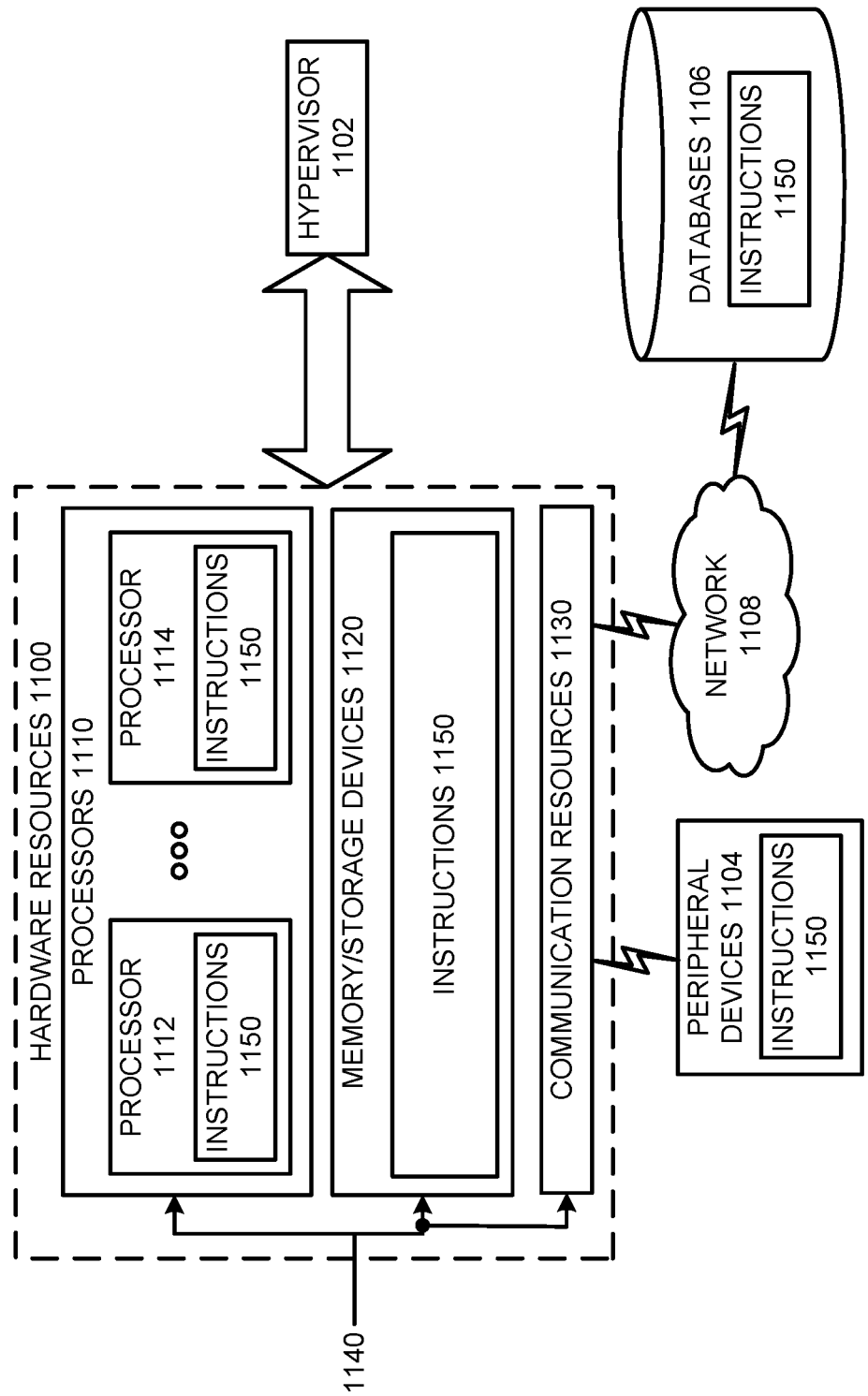
FIG. 11 is a block diagram illustrating components, according to some example embodiments, able to read instructions from a machine-readable or computer-readable medium (e.g., a non-transitory machine-readable storage medium) and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100.

The processors 1110 may include, for example, a processor 1112 and a processor 1114. The processor(s) 1110 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1120 may include main memory, disk storage, or any suitable combination thereof. The memory/storage devices 1120 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via USB), cellular communication components, NFC components, Bluetooth® (or Bluetooth® Low Energy) components, Wi-Fi® components, and other communication components.

Instructions 650 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 650 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

4. Example Implementations

Figure 12:
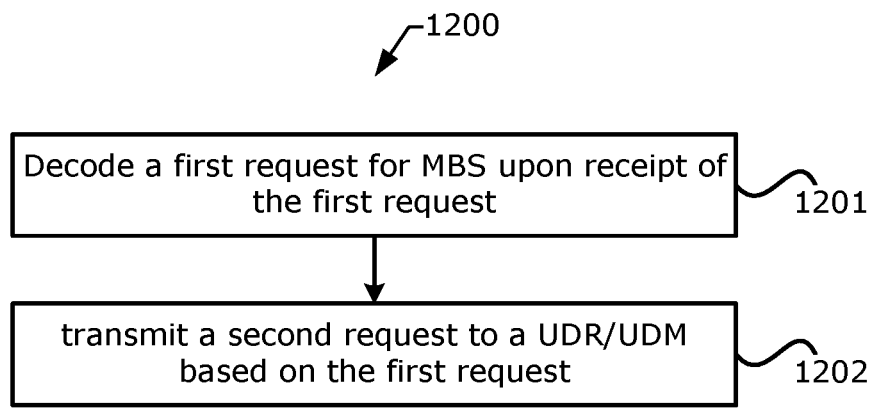
FIGS. 12 and 13 illustrate example procedures for practicing various embodiments discussed herein.
Figure 13:
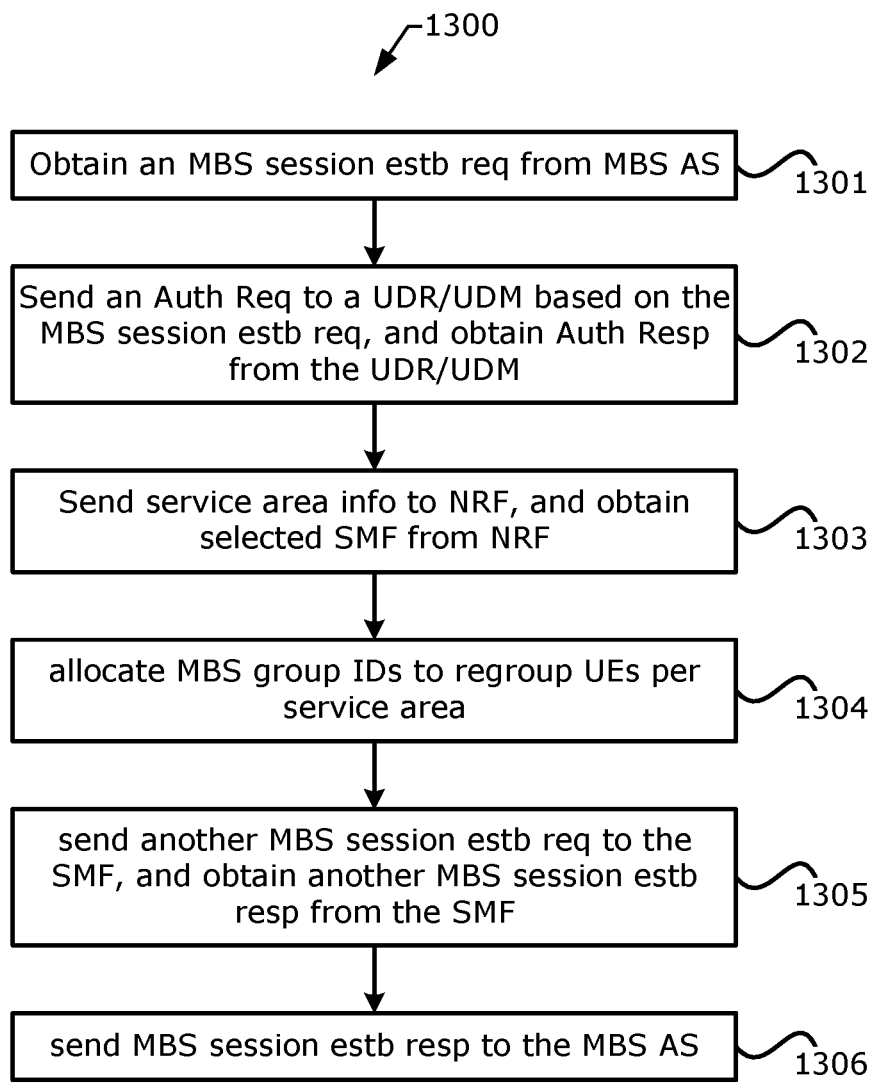

FIGS. 12 and 13 illustrate processes 1200 and 1300, respectively for practicing various embodiments herein. While particular examples and orders of operations are illustrated FIGS. 12 and 13, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Process 1200 begins at operation 1201 where a PCF 626 receives and decodes a first request for MBS. The first request may be an MBS session establishment request received from an MBS AS 628 that includes or indicates an App-ID, external group ID, QoS parameters, service areas, and/or other MB S-related information. At operation 1202, the PCF 626 transmits, based on the first request, a second request to a UDR 727 or UDM 627. The second request may be an authorization request including or indicating the App-ID, external group ID, service areas, etc., to check the authorization of the MBS AS 628 for the MBS services and the service subscription of the external group identifier and subscribed service of each UE 502 associated to the external group ID. The UDR 727 or UDM 627 may send an authorization response message to the PCF 626, which may include or indicate a QoS group list per service area wherein the QoS group list contains identities (e.g., SUPIs) of one or more UE 502.

Process 1300 begins at operation 1301 where the PCF 626 obtains an MBS session establishment request from an MBS AS 628. The MBS session establishment request includes an application identifier (App-ID), an external group identifier (ID), one or more Quality of Service (QoS) parameters for an MBS session, and one or more requested service areas for the MBS session. The MBS session establishment request may be obtained directly from the MBS AS 628 or via a NEF 623. The QoS parameters may include one or more of a packet error rate, a delay budget, QoS Class Identifier (QCI), QoS Identifier (5QI), Allocation and Retention Priority (ARP), Reflective QoS Attribute (RQA), Guaranteed Bit Rate (GBR), Guaranteed Flow Bit Rate (GFBR), Maximum Bit Rate (MBR), Aggregate MBR (AMBR), Maximum Flow Bit Rate (MFBR), notification control, and/or Maximum Packet Loss Rate.

At operation 1302, the PCF 626 sends an authentication request to a UDR 727/UDM 627, and obtains an authentication request from the UDR 727/UDM 627. The authentication response includes a QoS group list for each service area of the one or more requested service areas. The QoS group list for each service area includes one or more user equipment (UE) IDs. At operation 1303, the PCF 626 sends service area information of the one or more requested service areas to an NRF 625; and obtains an indication of one or more selected SMF(s) 624 from the NRF 625. At operation 1304, the PCF 626 allocates one or more MBS group IDs to regroup one or more UEs 6012 per service area based on the QoS group list for each service area and the selected SMF 624.

At operation 1305, the PCF 626 sends another MBS session establishment request to the selected SMF, the other MBS session establishment request including the MBS group IDs and corresponding QoS policies of each MBS group; and obtains an MBS session establishment response from the SMF, the MBS session establishment response including one or more MBS group IDs and one or more Data Network Access Identifiers (DNAIs). In some embodiments, the PCF 626 stores, for each MBS App-ID, MBS session information of at least one QoS flow. At operation 1306, the PCF 626 sends another MBS session establishment response to the MBS AS 628. The other MBS session establishment response includes an App-ID, external group ID, MBS group IDs with associated UE IDs in each QoS group list, and a DNAI per MBS group. After operation 1306, process 1300 may end or repeat as necessary.

Additional examples of the presently described embodiments include the following, non-limiting implementations. Each of the following non-limiting examples may stand on its own or may be combined in any permutation or combination with any one or more of the other examples provided below or throughout the present disclosure.

Example 1 includes a method for requesting different QoS MBS session for MBS service is to enable the support of an MBS Application server to request MBS service to PCF directly or via NEF in 5GC for establishing a MBS session, in which the message includes external group ID, App ID, QoS parameters of the MBS session, and requested service areas, wherein the QoS parameters includes packet error rate, delay budget, MBR or GBR.

Example 2 includes the method of example 1, the PCF sends the request to the UDR/UDM to check the authorization of the MBS AS for the MBS services and the service subscription of the external group identifier and subscribed service of each UEs associated to the external group ID, wherein the Authorization request message includes information of App-ID, external group ID, service areas and the Authorization response message includes QoS group list per service area whereby the QoS group list contains UEs' identities (SUPIs).

Example 3 includes the method of example 2, whereby the PCF contacts NRF to select one or more SMFs with service areas information. With the SMFs information, the PCF further allocates one or more MBS group IDs to regroup the UEs per service area based on the information obtained from UDM/UDR.

Example 4 includes the method of example 3, whereby the PCF provides MBS group ID and corresponding QoS policies of each MBS group to the SMF. When the SMF obtains QoS policies from PCF, it establishes an MBS session by configuring a UPF with corresponding QoS policies with QoS parameters for one or more MBS QoS flow, in which each MBS QoS flow is associated to a MBS group ID. That is, for an MBS App-ID, a UPF may configure one MBS session with multiple QoS flows (identified by different QoS flow ID) with different set of QoS parameters. In this step, a QoS flow ID is associated with the MBS group ID. In addition, the SMF can determine if adding PSA (PDU session anchor) connecting to the UPF capable of MBS for the MBS sessions by fulfilling the QoS policies of some MBS QoS flows.

Example 5 includes the method of example 4, wherein the SMF configures one or more UPFs and returns corresponding DNAIs (Data Network Access ID) to the PCF using N4 session establishment request/response messages.

Example 6 includes the method of example 5, wherein the SMF replies MBS session establishment response message including MBS group ID(s) and its corresponding DNAI(s) to PCF. There may be one or more MBS group IDs allocated by the PCF. For each MBS App-ID, the PCF stores MBS session information of one QoS flow as follows: MBS App-ID; MBS group ID: associated QoS policy with QoS parameters, DNAI for the downlink UPF session from MBS AS Example 7 includes the method of example 6, wherein the PCF replies the MBS AS with the information of app-ID, external group ID, MBS group IDs with associated UEs' Identities (GPSIs) in QoS group list, and the DNAI per group, in which the allocation of MBS group ID may be updated based on operator's policies for security and privacy consideration and when there is a changes of the UE's service subscriptions.

Example 8 includes a method, comprising: decoding, upon reception, a first request for Multicast-Broadcast Service (MB S) service; and transmitting, based on the first request, a second request to a Unified Data Repository (UDR) or Unified Data Management (UDM).

Example 9 includes the method of example 8 or some other example herein, wherein the request is transmitted by an MBS application server (AS) directly or via a Network Exposure function (NEF) for establishing a MBS session.

Example 10 includes the method of example 8 or some other example herein, wherein the first request includes one or more of an external group ID, an application ID, QoS parameters of an MBS session, and one or more requested service areas.

Example 11 includes the method of example 10 or some other example herein, wherein the second request includes information that is included in the first request.

Example 12 includes the method of example 8 or some other example herein, wherein the second request is an authorization request.

Example 13 includes the method of example 8 or some other example herein, further comprising decoding an authorization response that is transmitted by the UDR or UDM.

Example 14 includes the method of example 13 or some other example herein, wherein the authorization response includes an QoS group list per service area.

Example 15 includes the method of example 14 or some other example herein, wherein the QoS group list includes one or more UE identities.

Example 16 includes the method of example 15 or some other example herein, wherein the one or more UE identities include one or more SUbscription Permanent Identifiers (SUPIs).

Example 17 includes the method of example 13 or some other example herein, further comprising transmitting a third request to a Network Repository Function (NRF) for selecting one or more Session Management Functions (SMFs) with corresponding service area information.

Example 18 includes the method of example 17 or some other example herein, further comprising transmitting one or more messages to the one or more SMFs and wherein the one or more messages respectively includes MBS group IDs and associated QoS policies.

Example 19 includes the method of example 18 or some other example herein, further comprising decoding, upon reception from the one or more SMFs, one or more MBS session establishment response messages that include one or more MBS group IDs.

Example 20 includes the method of example 19 or some other example herein, further comprising transmitting, in response to the first request, a response message to the MBS AS, and wherein the response message includes at least one piece of information that indicates the application ID, external group ID, NBS group IDs with associated UE identities in the QoS group list, and Data Network Access Identifier (DNAI) associated with respective groups.

Example 21 includes the method of example 20 or some other example herein, wherein the associated UE identities are Generic Public Subscription Identifiers (GPSIs).

Example 22 includes the method of example 19 or some other example herein, further comprising storing the associated QoS policies with corresponding Radio Access Network (RAN) nodes and/or UEs.

Example 23 includes the method of example 19 or some other example herein, further comprising storing the associated group policy with corresponding MBS group ID and MBS application ID.

Example 23 includes the method of example 8 or 19 or some other example herein, further comprising initiating a UE configuration update request procedure for one or more indicated UE.

Example 24 includes the method of examples 8-23 or some other example herein, wherein the method is performed by a Policy Control Function (PCF) or a portion thereof.

Example 25 includes a method, comprising: transmitting request for Multicast-Broadcast Service (MBS) service; and transmitting a message that includes information regarding MBS sessions to respective UEs.

Example 26 includes the method of example 25 or some other example herein, wherein the information regarding MBS sessions includes an MBS group ID, an MBS application ID, and schedule information of one or more subscribed MBS sessions.

Example 27 includes the method of example 26 or some other example herein, wherein the schedule information includes corresponding frequencies, start and/or stop time, and duration that are associated with the one or more subscribed MBS sessions.

Example 29 includes the method of example 25 or some other example herein, further comprising transmitting, to a UE, a second request for requesting results of an MBS reception report.

Example 30 includes the method of example 29 or some other example herein, wherein the request for the report from the UE via an application layer.

Example 31 includes the method of examples 25-30 or some other example herein, wherein the method is performed by an MBS AS or a portion thereof.

Example 32 includes a method, comprising: decoding, upon reception from an MBS AS, a request for reporting an MB S reception; determining an MB S QoS status in an uplink NAS-transport message; and generating a report to report the MBS reception.

Example 33 includes the method of example 32 or some other example herein, further comprising receiving the MBS session.

Example 34 includes the method of examples 32-33 or some other example herein, wherein the method is performed by a UE or a portion thereof Example Z01 includes an apparatus comprising means to perform one or more elements of a method described in or related to any of examples 1-34, or any other method or process described herein.

Example Z02 includes one or more non-transitory computer-readable media comprising instructions to cause an electronic device, upon execution of the instructions by one or more processors of the electronic device, to perform one or more elements of a method described in or related to any of examples 1-34, or any other method or process described herein.

Example Z03 includes an apparatus comprising logic, modules, or circuitry to perform one or more elements of a method described in or related to any of examples 1-34, or any other method or process described herein.

Example Z04 includes a method, technique, or process as described in or related to any of examples 1-34, or portions or parts thereof.

Example Z05 includes an apparatus comprising: one or more processors and one or more computer-readable media comprising instructions that, when executed by the one or more processors, cause the one or more processors to perform the method, techniques, or process as described in or related to any of examples 1-34, or portions thereof.

Example Z06 includes a signal as described in or related to any of examples 1-34, or portions or parts thereof.

Example Z07 includes a datagram, packet, frame, segment, protocol data unit (PDU), or message as described in or related to any of examples 1-34, or portions or parts thereof, or otherwise described in the present disclosure.

Example Z08 includes a signal encoded with data as described in or related to any of examples 1-34, or portions or parts thereof, or otherwise described in the present disclosure.

Example Z09 includes a signal encoded with a datagram, packet, frame, segment, protocol data unit (PDU), or message as described in or related to any of examples 1-34, or portions or parts thereof, or otherwise described in the present disclosure.

Example Z10 includes an electromagnetic signal carrying computer-readable instructions, wherein execution of the computer-readable instructions by one or more processors is to cause the one or more processors to perform the method, techniques, or process as described in or related to any of examples 1-34, or portions thereof.

Example Z11 includes a computer program comprising instructions, wherein execution of the program by a processing element is to cause the processing element to carry out the method, techniques, or process as described in or related to any of examples 1-34, or portions thereof.

Example Z12 includes a signal in a wireless network as shown and described herein.

Example Z13 includes a method of communicating in a wireless network as shown and described herein.

Example Z14 includes a system for providing wireless communication as shown and described herein.

Example Z15 includes a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

5. Terminology

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable gate array (FPGA), programmable logic device (PLD), complex PLD (CPLD), high-capacity PLD (HCPLD), System-on-Chip (SoC), System-in-Package (SiP), Multi-Chip Package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including random access memory (RAM), magnetoresistive RAM (MRAM), phase change random access memory (PRAM), dynamic random access memory (DRAM) and/or synchronous dynamic random access memory (SDRAM), core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, etc.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "SMTC" refers to an SSB-based measurement timing configuration configured by SSB-MeasurementTimingConfiguration. The term "SSB" refers to an SS/PBCH block. The term "a "Primary Cell" refers to the MCG cell, operating on the primary frequency, in which the UE either performs the initial connection establishment procedure or initiates the connection re-establishment procedure. The term "Primary SCG Cell" refers to the SCG cell in which the UE performs random access when performing the Reconfiguration with Sync procedure for DC operation. The term "Secondary Cell" refers to a cell providing additional radio resources on top of a Special Cell for a UE configured with CA. The term "Secondary Cell Group" refers to the subset of serving cells comprising the PSCell and zero or more secondary cells for a UE configured with DC. The term "Serving Cell" refers to the primary cell for a UE in RRC CONNECTED not configured with CA/DC there is only one serving cell comprising of the primary cell. The term "serving cell" or "serving cells" refers to the set of cells comprising the Special Cell(s) and all secondary cells for a UE in RRC CONNECTED configured with carrier aggregation (CA). The term "Special Cell" refers to the PCell of the MCG or the PSCell of the SCG for DC operation; otherwise, the term "Special Cell" refers to the Pcell.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including 3GPP C-V2X), Dedicated Short Range Communications (DSRC) communication systems such as Intelligent-Transport-Systems (ITS) including the European ITS-G5, ITS-GSB, ITS-GSC, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "access network" refers to any network, using any combination of radio technologies, RATs, and/or communication protocols, used to connect user devices and service providers. In the context of WLANs, an "access network" is an IEEE 802 local area network (LAN) or metropolitan area network (MAN) between terminals and access routers connecting to provider services. The term "access router" refers to router that terminates a medium access control (MAC) service from terminals and forwards user traffic to information servers according to Internet Protocol (IP) addresses.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. An apparatus to be employed as a Policy Control Function (PCF), the apparatus comprising:
    interface circuitry operable to:
        obtain a Multicast-Broadcast Service (MBS) session establishment request from an MBS Application Server (AS), MBS session establishment request including an application identifier (App-ID), an external group identifier (ID), one or more Quality of Service (QoS) parameters for an MBS session, and one or more requested service areas for the MBS session, and
        send an authentication request to a Unified Data Repository (UDR) or a Unified Data Management (UDM); and
    processor circuitry communicatively coupled with the interface circuitry, the processor circuitry operable to generate the authentication request to include the App-ID, external group ID, and the one or more requested service areas.

2. The apparatus of claim 1, wherein the interface circuitry is operable to obtain the MBS session establishment request directly from the MBS AS or via a Network Exposure Function (NEF).

3. The apparatus of claim 1, wherein the QoS parameters include or indicate one or more of a packet error rate, a delay budget, QoS Class Identifier (QCI), QoS Identifier (5QI), Allocation and Retention Priority (ARP), Reflective QoS Attribute (RQA), Guaranteed Bit Rate (GBR), Guaranteed Flow Bit Rate (GFBR), Maximum Bit Rate (MBR), Aggregate MBR (AMBR), Maximum Flow Bit Rate (MFBR), notification control, and Maximum Packet Loss Rate.

4. The apparatus of claim 1, wherein the interface circuitry is further operable to:
    obtain an authentication response from the UDR or the UDM, the authentication response including a QoS group list for each service area of the one or more requested service areas.

5. The apparatus of claim 4, wherein the QoS group list for each service area includes one or more user equipment (UE) IDs.

6. The apparatus of claim 4, wherein the interface circuitry is further operable to:
    send service area information of the one or more requested service areas to a Network Repository Function (NRF); and
    obtain an indication of a selected Session Management Function (SMF) from the NRF.

7. The apparatus of claim 6, wherein the processor circuitry is further operable to:
    allocate one or more MBS group IDs to regroup one or more UEs per service area based on the QoS group list for each service area and the selected SMF.

8. The apparatus of claim 7, wherein the interface circuitry is further operable to:
    send another MBS session establishment request to the selected SMF, the other MBS session establishment request including the allocated one or more MBS group IDs and corresponding QoS policies of each MBS group; and
    obtain an MBS session establishment response from the SMF, the MBS session establishment response including one or more other MBS group IDs and one or more Data Network Access Identifiers (DNAIs).

9. The apparatus of claim 8, wherein the processor circuitry is further operable to:
    store, for each MBS App-ID, MBS session information of at least one QoS flow.

10. The apparatus of claim 8, wherein:
    the processor circuitry is further operable to:
        generate another MBS session establishment response to include an App-ID, external group ID, MBS group IDs with associated UE IDs in each QoS group list, and a DNAI per MBS group, and
        determine one or more radio access network (RAN) nodes serving one or more UEs in the MBS groups; and
    the interface circuitry is further operable to:
        send the other MBS session establishment response to the MBS AS, and
        send the MBS App-ID, the MBS group ID, and an MBS group policy to the determined RAN nodes for announcing the MBS group policy.

11. The apparatus of claim 10, wherein:
    the processor circuitry is further operable to:
        determine one or more radio access network (RAN) nodes serving one or more UEs in the MBS groups, and
        generate respective MBS service invite messages for the determined RAN nodes to include selected QoS profiles of corresponding ones of the one or more UEs, wherein the selected QoS profiles include one or more QoS flow IDs and one or more QoS parameters; and
    the interface circuitry is further operable to send the respective MBS service invite messages to the determined RAN nodes, and obtain respective MBS service responses from the determined RAN nodes.

12. The apparatus of claim 11, wherein:
    the interface circuitry is further operable to obtain an indication of scheduled resources for announcing an MBS group policy for respective MBS sessions associated with each MBS group; and the processor circuitry is further operable to store the MBS group policy in association with the respective MBS sessions.

13. The apparatus of claim 12, wherein:
the interface circuitry is further operable to obtain an MBS group policy provisioning request from the MBS AS, the MBS group policy provisioning request including an MBS App-ID, the MBS group ID, and the MBS group policy for an MBS session schedule; and
the processor circuitry is further operable to store the MBS group policy in association with the MBS group policy, the MBS group ID, or the MBS App-ID.

14. The apparatus of claim 11, wherein the interface circuitry is further operable to:
send the MBS App-ID, the MBS group ID, and the MBS group policy to the determined RAN nodes for announcing the MBS group policy.

15. One or more non-transitory computer-readable media (NTCRM) comprising instructions, wherein execution of the instructions by one or more processors of a Policy Control Function (PCF) is to cause the PCF to:
obtain a Multicast-Broadcast Service (MBS) session establishment request directly from an MBS Application Server (AS) or via a Network Exposure Function (NEF), MBS session establishment request including an application identifier (App-ID), an external group identifier (ID), one or more Quality of Service (QoS) parameters for an MBS session, and one or more requested service areas for the MBS session;
send an authentication request to a Unified Data Repository (UDR) or a Unified Data Management (UDM), the authentication request to include the App-ID, external group ID, and the one or more requested service areas; and
obtain an authentication response from the UDR or the UDM, the authentication response including a QoS group list for each service area of the one or more requested service areas.

16. The one or more NTCRM of claim 15, wherein execution of the instructions is to cause the PCF to:
send service area information of the one or more requested service areas to a Network Repository Function (NRF); and
obtain an indication of a selected Session Management Function (SMF) from the NRF.

17. The one or more NTCRM of claim 16, wherein execution of the instructions is to cause the PCF to:
allocate one or more MBS group IDs to regroup one or more UEs per service area based on the QoS group list for each service area and the selected SMF.

18. The one or more NTCRM of claim 17, wherein execution of the instructions is to cause the PCF to:
send another MBS session establishment request to the selected SMF, the other MBS session establishment request including the allocated one or more MBS group IDs and corresponding QoS policies of each MBS group;
obtain an MBS session establishment response from the SMF, the MBS session establishment response including one or more MBS group IDs and one or more Data Network Access Identifiers (DNAIs); and
store, for each MBS App-ID, MBS session information of at least one QoS flow.

19. The one or more NTCRM of claim 18, wherein execution of the instructions is to cause the PCF to:
send another MBS session establishment response to the MBS AS, the other MBS session establishment response to include an App-ID, external group ID, MBS group IDs with associated UE IDs in each QoS group list, and a DNAI per MBS group.

20. The one or more NTCRM of claim 15, wherein: the QoS group list for each service area includes one or more user equipment (UE) IDs, and the QoS parameters include or indicate one or more of a packet error rate, a delay budget, QoS Class Identifier (QCI), QoS Identifier (5QI), Allocation and Retention Priority (ARP), Reflective QoS Attribute (RQA), Guaranteed Bit Rate (GBR), Guaranteed Flow Bit Rate (GFBR), Maximum Bit Rate (MBR), Aggregate MBR (AMBR), Maximum Flow Bit Rate (MFBR), notification control, and Maximum Packet Loss Rate.

* * * * *